(12) United States Patent
Jayathirtha et al.

(10) Patent No.: US 12,141,731 B2
(45) Date of Patent: Nov. 12, 2024

(54) PERFORMANCE METRIC ASSURANCE FOR ASSET MANAGEMENT

(71) Applicant: Honeywell International Inc., Charlotte, NC (US)

(72) Inventors: Srihari Jayathirtha, Johns Creek, GA (US); Kalimulla Khan, Bangalore (IN); Jayasenthilnathan Balasubramanian, Phoenix, AZ (US); Yogiraj Dattaram More, Lenzburg (CH)

(73) Assignee: Honeywell International Inc., Charlotte, NC (US)

( * ) Notice: Subject to any disclaimer, the term of this patent is extended or adjusted under 35 U.S.C. 154(b) by 3 days.

(21) Appl. No.: 17/581,405

(22) Filed: Jan. 21, 2022

(65) Prior Publication Data

US 2023/0237404 A1  Jul. 27, 2023

(51) Int. Cl.
 *G06Q 10/0635* (2023.01)
 *G06Q 10/0639* (2023.01)

(52) U.S. Cl.
 CPC ... *G06Q 10/0635* (2013.01); *G06Q 10/06393* (2013.01)

(58) Field of Classification Search
 CPC ............ G06Q 10/0635; G06Q 10/06393
 See application file for complete search history.

(56) References Cited

U.S. PATENT DOCUMENTS 9,294,361 B1 * 3/2016 Choudhary ....... G06F 16/90335
9,606,520 B2   3/2017 Noboa et al.
(Continued)

FOREIGN PATENT DOCUMENTS

CN  104680260 B  * 8/2018  ......... G06Q 10/0635
EP  3627261 A1   3/2020
(Continued)

OTHER PUBLICATIONS

Haring et al. "A performance-based tabular approach for joint systematic improvement of risk control and resilience applied to telecommunication grid, gas network, and ultrasound localization system" (2021) (https://link.springer.com/article/10.1007/s10669-021-09811-5) (Year: 2021).*

(Continued)

*Primary Examiner* — Sujay Koneru
(74) *Attorney, Agent, or Firm* — Alston & Bird LLP

(57) ABSTRACT

Various embodiments described herein relate to performance assurance modeling for a portfolio of assets. In this regard, a request to generate one or more performance assurance insights related to one or more assets is received. The request includes a fault descriptor describing one or more faults associated with the one or more assets. In response to the request, a first risk level associated with the one or more faults is determined based on the fault descriptor and asset data associated with the one or more assets. Additionally, in response to the request, a second risk level associated with the one or more faults is generated based on one or more predetermined relationships between faults and asset performance indicator thresholds. The one or more performance assurance insights are then generated based on a comparison between the first risk level and the second risk level.

16 Claims, 20 Drawing Sheets

(56) References Cited

U.S. PATENT DOCUMENTS

| | | | |
|---|---|---|---|
| 10,546,135 B1* | 1/2020 | Kassoumeh | G06F 21/577 |
| 2012/0062239 A1* | 3/2012 | Rostron | H02H 7/26 |
| | | | 324/543 |
| 2012/0311416 A1* | 12/2012 | Richter | G06F 3/14 |
| | | | 345/593 |
| 2012/0317058 A1* | 12/2012 | Abhulimen | G06N 20/00 |
| | | | 706/2 |
| 2013/0069792 A1 | 3/2013 | Blevins et al. | |
| 2014/0336785 A1* | 11/2014 | Asenjo | G06Q 10/06 |
| | | | 700/17 |
| 2014/0336795 A1* | 11/2014 | Asenjo | G05B 19/4083 |
| | | | 700/86 |
| 2014/0337086 A1* | 11/2014 | Asenjo | G06F 3/0635 |
| | | | 705/7.28 |
| 2014/0365422 A1* | 12/2014 | Hampapur | G06N 5/02 |
| | | | 706/58 |
| 2015/0227870 A1* | 8/2015 | Noboa | G06Q 10/0635 |
| | | | 705/7.28 |
| 2015/0278219 A1* | 10/2015 | Phipps | G06F 16/2358 |
| | | | 707/711 |
| 2016/0048938 A1* | 2/2016 | Jones | G06Q 10/06315 |
| | | | 705/7.28 |
| 2016/0091555 A1* | 3/2016 | Drouere | H02H 3/385 |
| | | | 324/521 |
| 2016/0196513 A1* | 7/2016 | Mallon | G06F 11/3409 |
| | | | 705/7.28 |
| 2017/0357240 A1 | 12/2017 | Stewart et al. | |
| 2018/0174067 A1* | 6/2018 | Spiro | G06N 20/00 |
| 2019/0391191 A1* | 12/2019 | Obbalareddi Demudu | H02H 7/265 |
| 2020/0201950 A1* | 6/2020 | Wang | G06N 20/00 |
| 2020/0241949 A1* | 7/2020 | Basu | G06F 11/0775 |
| 2020/0293933 A1* | 9/2020 | Ghosh | G06F 18/10 |
| 2020/0293950 A1* | 9/2020 | Sanchez | G06N 3/006 |
| 2021/0174289 A1* | 6/2021 | Lo | G06Q 10/06395 |
| 2021/0225529 A1 | 7/2021 | Viengkham et al. | |
| 2022/0050736 A1* | 2/2022 | Khorasgani | G06F 11/073 |
| 2022/0329476 A1* | 10/2022 | Watfa | H04L 41/147 |

FOREIGN PATENT DOCUMENTS

| | | |
|---|---|---|
| EP | 3711262 A1 | 9/2020 |
| JP | 2005-234861 A | 9/2005 |
| JP | 2009-178713 A | 8/2009 |
| JP | 2013-084251 A | 5/2013 |
| JP | 2019-191990 A | 10/2019 |
| JP | 2021-114289 A | 8/2021 |
| WO | 2019/099367 A1 | 5/2019 |

OTHER PUBLICATIONS

Zhang, Yun-Yi et al., Linking data model and formula to automate KPI calculation for building performance benchmarking, May 12, 2022, Energy Reports, 1326-1337, 7.

European search report Mailed on Jun. 6, 2023 for EP Application No. 23151784, 10 page(s).

General Electric, "GE Digital Twin: Analytic Engine for the Digital Power Plant," Retrieved from the Internet: URL: https://www.ge.com/digital/sites/default/files/digital-twin-for-the-digital-power-plant-.pdf [retrieved on Aug. 23, 2018].

AU Office Action Mailed on Oct. 12, 2023 for AU Application No. 2023200181, 4 page(s).

JP Office Action Mailed on Feb. 21, 2024 for JP Application No. 2023005919, 10 page(s).

SA Office Action Mailed on Jun. 19, 2024 for SA Application No. 123441105, 13 page(s).

* cited by examiner

PERFORMANCE METRIC ASSURANCE FOR ASSET MANAGEMENT

TECHNICAL FIELD

The present disclosure relates generally to real-time asset analytics, and more particularly to real-time asset analytics for a portfolio of assets.

BACKGROUND

Traditionally, data analytics and/or digital transformation of data related to assets and/or asset zones generally involves human interaction. However, often times a specialized worker (e.g., a manager) is responsible for a large portfolio of assets (e.g., 1000 buildings each with 100 assets such as a boiler, a chiller, a pump, sensors, etc.). Therefore, it is generally difficult to identify and/or fix issues with the large portfolio of assets. For example, in certain scenarios, multiple assets (e.g., 25 assets) from the large portfolio of assets may have an issue. Furthermore, a limited amount of time is traditionally spent on modeling of data related to assets to, for example, provide insights related to the data. As such, computing resources related to data analytics and/or digital transformation of data related to assets are traditionally employed in an inefficient manner.

SUMMARY

In accordance with an embodiment of the present disclosure, a system comprises one or more processors, memory, and one or more programs stored in the memory. The one or more programs include instructions configured to receive a request to generate one or more performance assurance insights related to one or more assets. The request comprises a fault descriptor describing one or more faults associated with the one or more. The one or more programs also include instructions configured to, in response to the request, determine a first risk level associated with the one or more faults based on the fault descriptor and asset data associated with the one or more assets. The one or more programs also include instructions configured to, in response to the request, determine a second risk level associated with the one or more faults based on one or more predetermined relationships between faults and asset performance indicator thresholds. The one or more programs also include instructions configured to, in response to the request, generate the one or more performance assurance insights related to the one or more assets based on a comparison between the first risk level and the second risk level.

In accordance with another embodiment of the present disclosure, a method is provided. The method provides for, at a device with one or more processors and a memory, receiving a request to generate one or more performance assurance insights related to one or more assets. The request comprises a fault descriptor describing one or more faults associated with the one or more assets. In response to the request, the method provides for determining a first risk level associated with the one or more faults based on the fault descriptor and asset data associated with the one or more assets. In response to the request, the method also provides for determining a second risk level associated with the one or more faults based on one or more predetermined relationships between faults and asset performance indicator thresholds. In response to the request, the method also provides for generating the one or more performance assurance insights related to the one or more assets based on a comparison between the first risk level and the second risk level.

In accordance with another embodiment of the present disclosure, a non-transitory computer-readable storage medium is provided. The non-transitory computer-readable storage medium comprises one or more programs for execution by one or more processors of a device. The one or more programs include instructions which, when executed by the one or more processors, cause the device to receive a request to generate one or more performance assurance insights related to one or more assets. The request comprises a fault descriptor describing one or more faults associated with the one or more assets. The one or more programs also include instructions which, when executed by the one or more processors and in response to the request, cause the device to determine a first risk level associated with the one or more faults based on the fault descriptor and asset data associated with the one or more assets. The one or more programs also include instructions which, when executed by the one or more processors and in response to the request, cause the device to determine a second risk level associated with the one or more faults based on one or more predetermined relationships between faults and asset performance indicator thresholds. The one or more programs also include instructions which, when executed by the one or more processors and in response to the request, cause the device to generate the one or more performance assurance insights related to the one or more assets based on a comparison between the first risk level and the second risk level.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
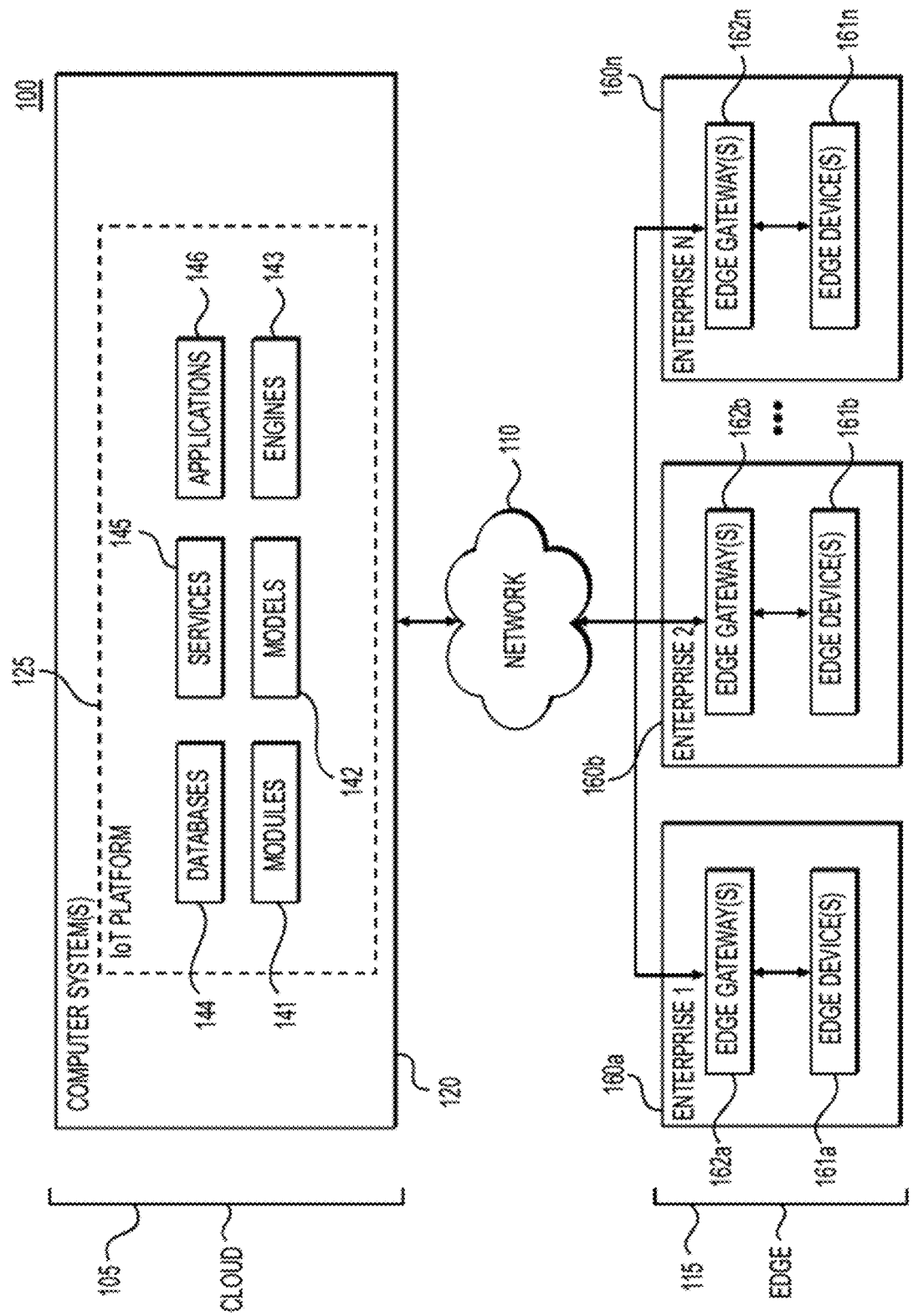
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

Traditionally, data analytics and/or digital transformation of data related to assets and/or asset zones generally involves human interaction. However, often times a specialized worker (e.g., a manager) is responsible for a large portfolio of assets (e.g., 1000 buildings each with 100 assets such as a boiler, a chiller, a pump, sensors, etc.). Therefore, it is generally difficult to identify and/or fix issues with the large portfolio of assets. For example, in certain scenarios, multiple assets (e.g., 25 assets) from the large portfolio of assets may have an issue. Furthermore, a limited amount of time is traditionally spent on modeling of data related to assets to, for example, provide insights related to the data. As such, computing resources related to data analytics and/or digital transformation of data related to assets are traditionally employed in an inefficient manner.

As an example, it is generally desirable for management personnel (e.g., executives, managers, etc.) to be provided with an understanding of which assets from a portfolio of assets require service, which assets from a portfolio of assets should be serviced first, etc. Additionally, it is generally desirable for management personnel (e.g., executives, managers, etc.) to be provided with improved technology to facilitate servicing of assets from a portfolio of assets. For example, traditional dashboard technology generally involves manual configuration of the dashboard to, for example, provide different insights for assets. Furthermore, traditional dashboard technology employed with dashboard data modelling of assets is generally implemented outside of a core application and/or asset model. Therefore, it is generally difficult to execute data modeling for assets in an efficient and/or accurate manner. In another example, a large portfolio of buildings may be installed with thousands of sensors and/or various other assets deployed in various zones. The sensors and/or other assets may be managed through a network of various hardware services and/or software services to provide a comfortable, healthy and/or safe environment for occupants of the buildings. However, such sensors and/or other assets may operate in an inefficient manner related to asset control, asset maintenance, asset energy consumption, and/or one or more other types of inefficiencies.

Thus, to address these and/or other issues, performance assurance modeling for a portfolio of assets is provided. In one or more embodiments, performance metric assurance for asset management related to a portfolio of assets is provided. In one or more embodiments, a model is provided to assess a performance state of one or more assets. The model is, for example, a performance indicator model for assets. In certain embodiments, the one or more assets are within a zone, an industrial facility, a building, and/or another enterprise region. In one or more embodiments, the model is employed to determine criticality of deviated performance indicators from one or more performance thresholds. In certain embodiments, one or more notifications are generated and/or one or more mitigative actions are performed in response to a performance state of the one or more assets satisfying performance assessment criteria. In certain embodiments, the model provides dynamic priorities to faults associated with the one or more assets such that the faults are addressed based on respective impact to the performance indicators. For example, in certain embodiments, dynamic impact of a specific fault is determined based on performance criteria, predictive maintenance criteria, energy optimization criteria, safety criteria, health criteria, occupant comfort criteria, occupant experience criteria, finance criteria, risk criteria related to occupants, risk criteria related to assets, and/or other criteria. In certain embodiments, the model is employed to assist with new assets installations based on historical data to mitigate risk of equipment failures. For example, in certain embodiments, an on-boarding process for a first industrial site employs a model associated with learnings and/or insights for a second industrial site.

In certain embodiments, the model is updated based on the performance assessment with respect to the one or more assets. For example, in certain embodiments, risks related to defined faults are continuously refined based on the performance indicators. In certain embodiments, the model is employed to simulate various scenarios (e.g., fault events) related to assets. In certain embodiments, the model is employed to predict and/or evaluate product improvements related to assets. In one or more embodiments, a correlation between faults and the performance indicators is dynamically determined and employed to provide the performance assessment with respect to the one or more assets. In one or more embodiments, service requests for the one or more assets are prioritized based on dynamic impact analysis of the faults with respect to the one or more assets. In one or more embodiments, an impact assessment model and/or a quality assurance model is employed to provide the performance assessment with respect to the one or more assets. In various embodiments, the performance indicators are associated with predicted failure modes and/or an assessment related to impact with respect to predicted failure modes.

In one or more embodiments, the impact assessment model includes a hazard assessment for one or more deviations with respect to performance indicators. In one or more embodiments, the impact assessment model additionally or alternatively includes a safety risk assessment using a plurality of models (e.g., probability of occurrence, severity of the occurrence, categorization of one or more factors impacting performance indicators, triage of factors based on the level of impact for performance indicators, etc. The impact assessment model further includes, in one or more embodiments, assessment of financial impact for failures for respective assets and/or respective asset events related to a deviation with respect to performance indicators. For example, financial impact includes cost of service analysis to re-establish deviation of performance indicators by modifying control mechanisms and/or maintenance mechanisms for respective assets. The impact assessment model is also adoptive to include other assessment techniques for performance indicators such as, for example, efficiency (e.g., electrical efficiency, fuel efficiency, etc.), criticality of occupant experience (e.g., air quality criteria, carbon dioxide criteria, temperature criteria, humidity criteria, etc.).

In one or more embodiments, a key performance indicator (KPI) model is employed to evaluates impact assessment and to develop a quality assurance model which defines risk levels and/or control mechanisms to provide continued effectiveness of implemented KPI management strategies for assets. For instance, in one or more embodiments, KPI modeling related to one or more assets is employed to provide improved efficiency related to the one or more assets such as, for example, improved asset control, improved asset maintenance, improved asset energy consumption, and/or one or more other types of efficiency improvements. In one or more embodiments, faults related to a portfolio of assets are monitored based on an asset status data stream (e.g., a device/equipment status data stream). In response to identifying faults, an assessment of all relevant performance indicators is performed based secondary sensor data (e.g., temperature sensors, smoke/fire detector data, etc.), service requests generated in response to a fault, and/or device specifications for assets. If an assessment of a fault differs from an assessment provided by the KPI model with respect to the portfolio of assets, the KPI model is refined with the new insights and the refined KPI model is set as a new KPI model for subsequent fault analysis and/or assessment of assets. An assessment of a fault includes, for example, a predicted risk level and/or priority information to resolve the fault. In an embodiment, the KPI model is employed as a reference for managing asset failures (e.g., device failures and/or equipment failures) related to a portfolio of assets. In an embodiment, the KPI model is employed to provide service request prioritization, inventory management, redundancy, pricing models, and/or predictive solutions related to a portfolio of assets. In one or more embodiments, a closed loop performance assessment system is provided to repeatedly provide performance assessment for a portfolio of assets and/or to achieve performance criteria related to performance indicators defined for the portfolio of assets. For instance, in one or more embodiments, continuous monitoring of the portfolio of assets is performed to collect performance indicator data, to execute a backend simulation of various failure modes, and/or to determine effectiveness of mitigative actions related to faults.

In a non-limiting example, prior to deployment of an asset management system related to one or more assets, a design of various systems (e.g., sensors, a building system, an HVAC system, etc.) is determined based on a Tier-1 layout of various zones within an enterprise. Furthermore, expected performance levels and/or performance indicators under various dynamic conditions are determined for one or more assets within the various zones. In an example embodiment, an enterprise system includes a zone with critical performance criteria and/or important performance indicators. For example, a zone may be an intensive care unit in a hospital, a metrological division where high precision gauges are preserved, or another type of zone associated with increased importance for an enterprise. In certain embodiments, the performance indicators for the zone is different and/or dynamically changes based on various scenarios and/or occupant requirements. Hence, deviation from a performance indicator in the zone would have different impact on enterprise objectives including safety, health, finance, productivity, etc.

By employing one or more techniques disclosed herein, optimization of operations for an asset is provided and/or down-time for an asset is reduced. In one or more embodiments, insights regarding opportunities for improving defined performance indicators are provided to minimize risk, enhance efficiency, and/or provide quality of service for assets. By employing one or more techniques disclosed herein, likelihood of meeting or exceeding performance requirements for assets is also achieved.

In certain embodiments, a dashboard visualization associated with the performance assurance modeling is provided via a mobile application for an asset performance management platform. In one or more embodiments, processed asset data personalized for a user is presented via the dashboard visualization. In various embodiments, the dashboard visualization facilitates digitized maintenance for the portfolio of assets, predictive maintenance for the portfolio of assets, energy optimization for the portfolio of assets, centralized control for the portfolio of assets, and/or other performance management for the portfolio of assets. In various embodiments, the dashboard visualization additionally or alternatively provides an optimal path to present one or more insights (e.g., one or more critical issues, a most critical issue, etc.) related to a portfolio of assets, an optimal path to resolve one or more issues related to a portfolio of assets, enhanced adherence to performance metrics for respective assets from a portfolio of assets, and/or improved efficiency related to workflows for respective assets from a portfolio of assets. Additionally, the dashboard visualization provides for improved operational efficiency of assets from the portfolio of assets, improved performance of assets from the portfolio of assets, reduced maintenance time related to assets from the portfolio of assets, and/or improved response time for issues related to the portfolio of assets.

In various embodiments, a mobile application platform for asset portfolio management is provided. In various embodiments, the mobile application platform facilitates operations and/or services that allows operators to maintain assets anytime and/or anywhere. In various embodiments, the mobile application platform interfaces with various backend products of connected asset offering, packages various asset data, provides an integrated view of asset data via a dashboard visualization. For instance, in various embodiments, the mobile application platform interfaces with various different products hosted by a cloud platform. In various embodiments, a user journey associated with the dashboard visualization is configured to provide a shortest possible time to acquire and/or display critical issue and/or asset performance insights related to the portfolio of assets. As such, in various embodiments, the mobile application platform facilitates faster response to issues related to a portfolio of assets and/or improves operational efficiency associated with the portfolio of assets. Furthermore, in various embodiments, the mobile application platform provides for improved productivity and reduced cost related to the portfolio of assets, improved monitoring with respect to the portfolio of assets, and/or improved efficiency of assets from the portfolio of assets (e.g., a reduced carbon footprint for assets from the portfolio of assets, etc.).

In various embodiments, the dashboard visualization is an enterprise application that allows a portfolio operator to remotely manage, investigate, and/or resolve issues associated with the portfolio of assets. For example, in various embodiments, the dashboard visualization facilitates connection of disparate asset systems to monitor and/or maintain the portfolio of assets. Integrating disparate asset systems into a unified connected system enables a user to interact with the aggregated data in a single view. The dashboard visualization also provides context awareness for the portfolio of assets and allows a user located remotely from the one or more assets in the portfolio of assets to understand issues related the portfolio of assets (e.g., without the need to understand the technology of each of the disparate asset systems). The dashboard visualization also facilitates managing different field protocols with multiple levels of intermediate supervisory control and data acquisition (SCADA) server systems while also providing uniform interactions. In various embodiments, the dashboard visualization is configured to provide control of assets (e.g., equipment) remotely using one or more protocols and/or with respect to different types of asset management systems in a portfolio of assets. In various embodiments, the dashboard visualization is accessible via a web portal and/or an application interface.

In various embodiments, the dashboard visualization facilitates aggregation of asset performance data into a score or metric value such as, for example, KPI. In various embodiments, the dashboard visualization additionally or alternatively facilitates providing recommendations to improve asset performance. In various embodiments, the dashboard visualization additionally or alternatively facilitates remote control and/or altering of asset set points. In one or more embodiments, the issues associated with the one or more assets are ordered such that issues with a largest impact with respect to the portfolio of assets is presented first via the dashboard visualization. Impact may be based on cost to repair an asset, energy consumption associated with issues related to the one or more assets, savings lost associated with issues related to the one or more assets, etc.

In various embodiments, a user may employ the dashboard visualization to identify issues associated with the portfolio of assets, to make adjustments with respect to the portfolio of assets, and/or to make work orders associated with the portfolio of assets. In various embodiments, a user may be subscribed to a performance management category (e.g., Energy Optimization, Digitized Maintenance, etc.) to facilitate determining issues for the portfolio of assets to be resolved and/or to facilitate determining an ordering for prioritized actions related to the portfolio of assets. For example, an ordering of prioritized actions may be different for Energy Optimization than Digitized Maintenance. In various embodiments, the dashboard visualization provides an alerts list that combines alerts from an on-premise building management system (BMS). In various embodiments, cloud analytics is performed to group alerts based on issues and/or to prioritize the issues based on one or more algorithms.

In one or more embodiments, the dashboard visualization provides notifications related to events, alarms, and/or issues (e.g., asset issues, performance issues, maintenance issues, etc.) associated the portfolio of assets. In certain embodiments, the notifications are personalized for a user associated with the dashboard visualization. In one or more embodiments, the dashboard visualization provides contextual information related to the portfolio of assets. The contextual information includes, for example, live property values, historical trends, asset relationships (e.g., asset relationship of an asset in service and/or service cases in related assets), and/or other information that provides contextual awareness for the portfolio of assets. In one or more embodiments, the dashboard visualization provides metrics related to the portfolio of assets. In one or more embodiments, the dashboard visualization generates a notification in response to a determination that a metric (e.g., a KPI) for an asset deviates from an asset goal, a defined metrics threshold, and/or another metrics criteria. In one or more embodiments, the dashboard visualization presents prediction data related to a root cause for one or more issues and/or one or more events related to the portfolio of assets. In one or more embodiments, the dashboard visualization provides asset health information related to the portfolio of assets. In one or more embodiments, the dashboard visualization is configured to initiate actions related to the portfolio of assets. The actions include, for example, set point changes for one or more assets from the portfolio of assets, release manual overrides for one or more assets from the portfolio of assets, and/or one or more other actions associated with one or more assets from the portfolio of assets. In one or more embodiments, the dashboard visualization is configured to facilitate collaboration and/or communications with one or more other user computing devices associated with user identifiers assigned to the portfolio of assets.

In various embodiments, the dashboard visualization provides a performance management solution related to presentation of issue-based cases related alerts and/or asset links. In various embodiments, the dashboard visualization centralizes portfolio operations to a single location to allow operators to easily understand an operational status of assets, to investigate issues related to assets, and/or to make control changes related to assets. As such, according to various embodiments, asset and/or workforce use is optimized, and highest priority issues related to the portfolio of assets is presented to a user in an optimal manner. Additionally, according to various embodiments, facility operating and/or maintenance costs are reduced while also improving equipment up-time, service operational efficiency, and/or environmental conditions by employing the dashboard visualization. Additionally, by employing the dashboard visualization according to various embodiments, remote triage of faults and/or remote resolution of asset issues is provided. Additionally, according to various embodiments, the dashboard visualization provides centralized capability to review, manage and/or control assets.

In various embodiments, the dashboard visualization facilitates alert and/or case management related to the portfolio of assets. For example, in various embodiments, the dashboard visualization provides a consolidated view of alerts from analytical products and/or directly from on-site systems that are combined into rich service cases. In various embodiments, the dashboard visualization facilitates triage and control. For example, in various embodiments, the dashboard visualization provides real-time data and/or historical trends related to assets. In various embodiments, features, attributes and/or relationships associated with the real-time data and/or historical trends are determined based on one or more artificial intelligence systems to, for example, troubleshoot equipment faults, control equipment, and/or change set-points to resolve issues within the dashboard visualization.

In various embodiments, the dashboard visualization facilitates display of graphics and/or other visualizations related to the portfolio of assets. For example, in various embodiments, the dashboard visualization provides dynamically generated graphics that show configuration of, relationships between, and/or location of assets in the portfolio of assets to, for example, enable knowledge associated with remote facilities, aiding of fault diagnosis, and/or performing actions related to issues. In various embodiments, the dashboard visualization facilitates operations and/or scheduling associated with the portfolio of assets. For example, in various embodiments, the dashboard visualization facilitate temporary or long-term changes to operational modes of assets can be made through scheduling changes and/or manual switching to allow for events, seasonal changes, maintenance periods and/or other changes to asset use or operations.

In various embodiments, the dashboard visualization presents alerts from different sources and/or different system types into a single alert screen to provide a prioritized view of issues related to a portfolio of assets. According to various embodiments, the alerts include alarms from on-premises BMS, security, fire and other systems. Additionally or alternatively, according to various embodiments, the alerts include alerts from analytics and/or rule-based cloud-located systems with respect to current states and/or historical states of assets. Additionally or alternatively, according to various embodiments, the alerts include alerts from systems monitoring an asset environment and/or health and safety conditions associated with assets. Additionally or alternatively, according to various embodiments, the alerts include alerts from cyber security systems. Additionally or alternatively, according to various embodiments, the alerts include alerts from systems monitoring of the health of assets. Additionally or alternatively, according to various embodiments, the alerts include manually entered alerts that may arise due to calls from building occupants, staff, technicians, etc. In various embodiments, the alerts are logically grouped and/or presented to an operator via the dashboard visualization. In various embodiments, the alerts are logically grouped based on location (e.g., geographic areas or buildings) and/or related assets. In various embodiments, the alerts are presented via the dashboard visualization such that the highest priority issues are at the top of the list of alerts. In various embodiments, prioritization of the alerts is determined based on type of asset, type of facility, use and size of area affected by the issues, number of assets, number of issues, types assigned priority of individual alerts, and/or other features associated with the assets. In various embodiments, machine learning is employed to logically group and/or present the alerts. In various embodiments, machine learning is employed to identify alerts that optimally reflect use by an operator of the dashboard visualization.

In various embodiments, an application programming interface is employed to integrate different visualization tools and/or different reporting tools (e.g., via the dashboard visualization). In one or more embodiments, a user-interactive graphical user interface is generated. For instance, in one or more embodiments, the graphical user interface renders a visual representation of the dashboard visualization. In one or more embodiments, one or more notifications for user devices are generated based on metrics associated with one or more assets of the portfolio of assets.

In one or more embodiments, the dashboard visualization allows a user to see how one or more assets are performing against one or more metrics (e.g., one or more KPIs). In one or more embodiments, the dashboard visualization allows a user to identify what next steps with respect to assets will provide an optimal return on investment for the action (e.g., repair device #1 vs. device #2) depending on the metrics (e.g., fixing device #1 will save X % energy, whereas repairing device #2 will save $Y). In one or more embodiments, the dashboard visualization allows a user to view individual assets through the dashboard (e.g., boiler #1 is operating at 90% efficiency, or will fail in X weeks, Y days, Z hours unless action is taken; and repairing the boiler #1 within a first interval of time will save $X, whereas repairing within a second interval of time will save $Y). In one or more embodiments, the dashboard visualization allows a user to change individual settings for an asset remotely. In one or more embodiments, the dashboard visualization notifies a user that changing settings for an asset from X to Y will save X % energy or $Y.

As such, by employing one or more techniques disclosed herein, asset performance for a portfolio of assets is optimized. Moreover, by employing one or more techniques disclosed herein, improved insights for opportunity and/or performance insights for a portfolio of assets is provided to a user via improved visual indicators associated with a graphical user interface. For instance, by employing one or more techniques disclosed herein, additional and/or improved asset insights as compared to capabilities of conventional techniques can be achieved across a data set. Additionally, performance of a processing system associated with data analytics is improved by employing one or more techniques disclosed herein. For example, a number of computing resources, a number of a storage requirements, and/or number of errors associated with data analytics is reduced by employing one or more techniques disclosed herein.

FIG. 1 illustrates an exemplary networked computing system environment 100, according to the present disclosure. As shown in FIG. 1, networked computing system environment 100 is organized into a plurality of layers including a cloud layer 105, a network layer 110, and an edge layer 115. As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

Figure 2:
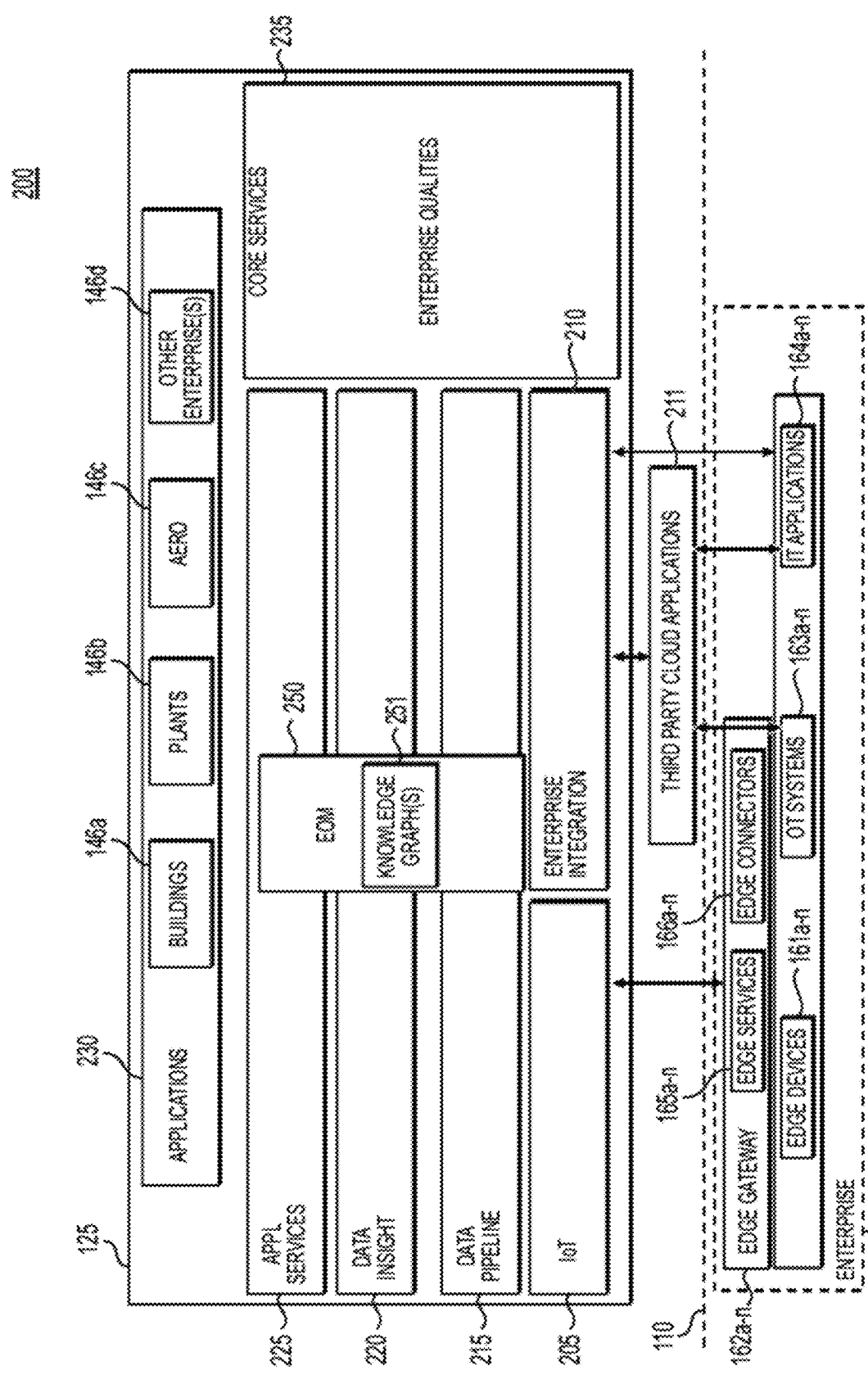
FIG. 2 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include assets, sensors, actuators, processors, computers, valves, pumps, ducts, vehicle components, cameras, displays, doors, windows, security components, boilers, chillers, pumps, air handler units, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations and/or analytics for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, the extensible object model 250 communicates with each layer 205-230 to contextualize site data of the enterprise 160a-160n using an extensible graph-based object model (or "asset model"). In one or more embodiments, the extensible object model 250 is associated with knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 includes a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a KPI framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 250 can automatically map the tag to the attribute based on naming conventions, parsing, and matching the tag and attribute descriptions and/or by comparing the behavior of the time series data with expected behavior. In one or more embodiments, each of the key attribute contributing to one or more metrics to drive a dashboard is marked with one or more metric tags such that a dashboard visualization is generated.

The modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 250 receiving raw model data from the edge 115 and running context discovery algorithms to generate the model. The context discovery algorithms read the context of the edge naming conventions of the edge devices 161a-161n and determine what the naming conventions refer to. For example, in one or more embodiments, the knowledge graph 250 receives "TMP" during the modeling phase and determine that "TMP" relates to "temperature." The generated models are then published. The complex onboarding process includes the knowledge graph 250 receiving the raw model data, receiving point history data, and receiving site survey data. According to various embodiments, the knowledge graph 250 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, in one or more embodiments, data is ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT platform 205. In some embodiments, only authorized data is sent to the IoT platform 125, and the IoT platform 125 only accepts data from authorized edge gateways 162a-162n and/or edge devices 161a-161n. According to various embodiments, data is sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third-party applications 211 rather than, or in combination with, receiving the data from the edge devices 161a-161n directly. In certain embodiments, the enterprise integration layer 210 enables a scalable architecture to expand interfaces to multiple systems and/or system configurations. In certain embodiments, the enterprise integration layer 210 enables integration with an indoor navigation system related to the enterprise 160a-160n.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161a-161n). For example, in an embodiment, a pump template defines pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161a-161n) instance is created, any associated calculation instances are also created with their input and output parameters linked to the appropriate attributes of the asset (e.g., edge device 161a-161n).

According to various embodiments, the IoT platform 125 supports a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160a-160n looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about an optimal corrective action to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, according to various embodiments, the applications 146a-d includes a buildings application 146a, a plants application 146b, an aero application 146c, and other enterprise applications 146d. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance and asset health. According to various embodiments, autonomous control includes energy optimization and/or predictive maintenance. As detailed above, according to various embodiments, the general applications 146 is extensible such that each application 146 is configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/ entitlements, logging/monitoring, usage metering, API gateway/dev portal, and the IoT platform 125 streams.

Figure 3:
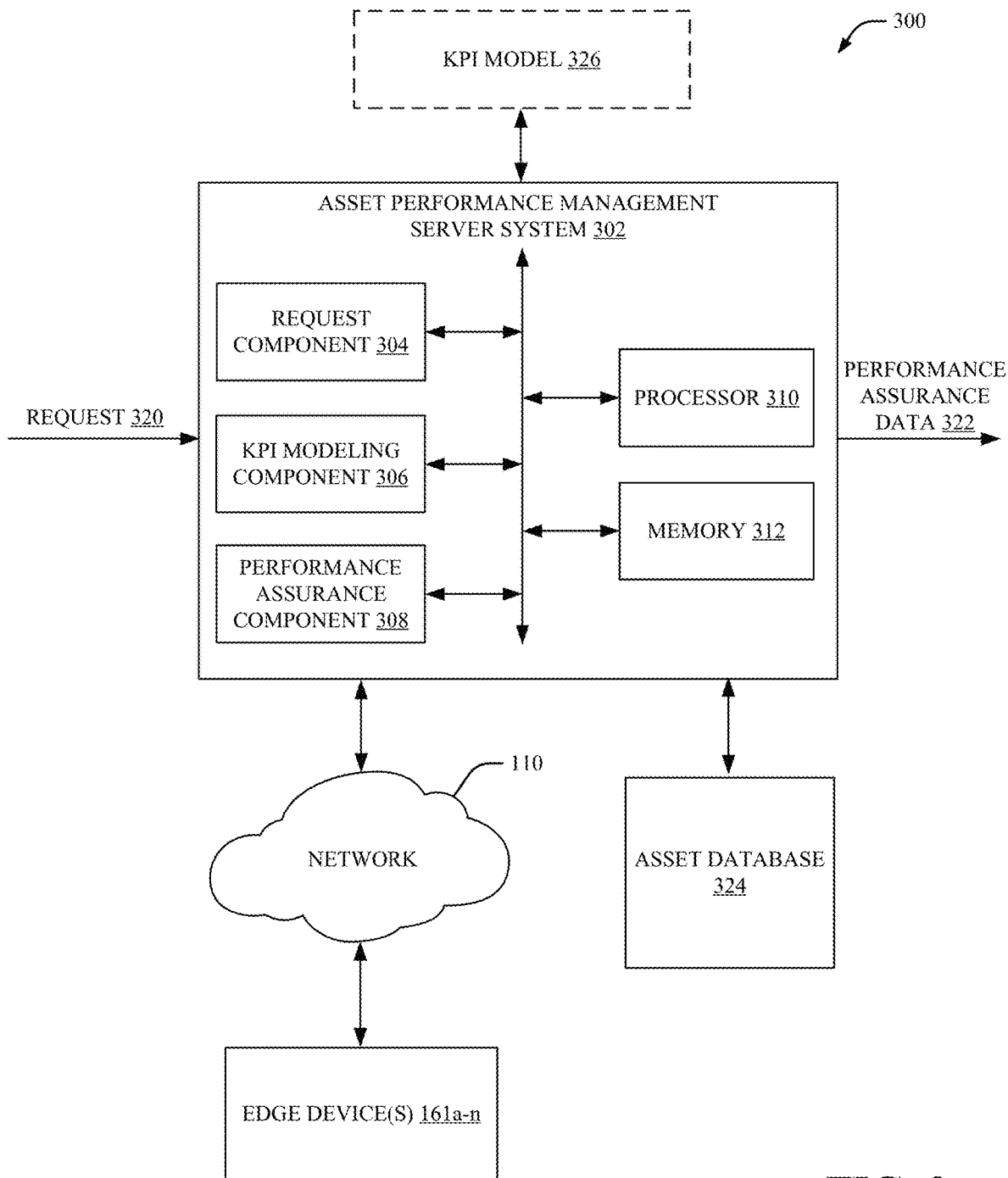
FIG. 3 illustrates a system that provides an exemplary environment, in accordance with one or more embodiments described herein.

FIG. 3 illustrates a system 300 that provides an exemplary environment according to one or more described features of one or more embodiments of the disclosure. According to an embodiment, the system 300 includes an asset performance management server system 302 to facilitate a practical application of data analytics technology to provide performance assurance modeling for a portfolio of assets. In various embodiments, the system 300 facilitates a practical application of data analytics technology and/or digital transformation technology to provide a dashboard visualization for a portfolio of assets and/or optimization related to enterprise performance management. In one or more embodiments, the asset performance management server system 302 facilitates a practical application of rendering asset data related to dashboard technology to provide optimization related to enterprise performance management. In one or more embodiments, the asset performance management server system 302 employs data that is aggregated from one or more assets and/or one or more data sources associated with an enterprise system (e.g., a building system, an industrial system or another type of enterprise system).

In an embodiment, the asset performance management server system 302 is a data analytics platform associated with a server system (e.g., a server device), one or more data sources, and/or one or more assets. In one or more embodiments, the asset performance management server system 302 is a device with one or more processors and a memory. In one or more embodiments, the asset performance management server system 302 corresponds to a computer system from the computer systems 120 to facilitate providing performance assurance modeling for a portfolio of assets and/or providing a dashboard visualization associated with a portfolio of assets. For example, in one or more embodiments, the asset performance management server system 302 is implemented via the cloud 105. The asset performance management server system 302 is also related to one or more technologies, such as, for example, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies.

Moreover, the asset performance management server system 302 provides an improvement to one or more technologies such as enterprise technologies, connected building technologies, industrial technologies, IoT technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies. In an implementation, the asset performance management server system 302 improves performance of a computing device. For example, in one or more embodiments, the asset performance management server system 302 improves processing efficiency of a computing device (e.g., a user computing device), reduces power consumption of a computing device (e.g., a user computing device), improves quality of data provided by a computing device (e.g., a user computing device), etc.

The asset performance management server system 302 includes a request component 304, a KPI modeling component 306 and/or a performance assurance component 308. Additionally, in one or more embodiments, the asset performance management server system 302 includes a processor 310 and/or a memory 312. In certain embodiments, one or more aspects of the asset performance management server system 302 (and/or other systems, apparatuses and/or processes disclosed herein) constitute executable instructions embodied within a computer-readable storage medium (e.g., the memory 312). For instance, in an embodiment, the memory 312 stores computer executable component and/or executable instructions (e.g., program instructions). Furthermore, the processor 310 facilitates execution of the computer executable components and/or the executable instructions (e.g., the program instructions). In an example embodiment, the processor 310 is configured to execute instructions stored in the memory 312 or otherwise accessible to the processor 310.

The processor 310 is a hardware entity (e.g., physically embodied in circuitry) capable of performing operations according to one or more embodiments of the disclosure. Alternatively, in an embodiment where the processor 310 is embodied as an executor of software instructions, the software instructions configure the processor 310 to perform one or more algorithms and/or operations described herein in response to the software instructions being executed. In an embodiment, the processor 310 is a single core processor, a multi-core processor, multiple processors internal to the asset performance management server system 302, a remote processor (e.g., a processor implemented on a server), and/or a virtual machine. In certain embodiments, the processor 310 is in communication with the memory 312, the request component 304, the KPI modeling component 306 and/or the performance assurance component 308 via a bus to, for example, facilitate transmission of data among the processor 310, the memory 312, the request component 304, the KPI modeling component 306 and/or the performance assurance component 308. The processor 310 may be embodied in a number of different ways and, in certain embodiments, includes one or more processing devices configured to perform independently. Additionally or alternatively, in one or more embodiments, the processor 310 includes one or more processors configured in tandem via a bus to enable independent execution of instructions, pipelining of data, and/or multi-thread execution of instructions.

The memory 312 is non-transitory and includes, for example, one or more volatile memories and/or one or more non-volatile memories. In other words, in one or more embodiments, the memory 312 is an electronic storage device (e.g., a computer-readable storage medium). The memory 312 is configured to store information, data, content, one or more applications, one or more instructions, or the like, to enable the asset performance management server system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

The request component 304 is configured to receive a request 320. In one or more embodiments, the request 320 is a request to generate one or more performance assurance insights related to one or more assets included in a portfolio of assets. For instance, in one or more embodiments, the request 320 is a request to generate one or more performance assurance insights related to the edge devices 161a-161n (e.g., the edge devices 161a-161n included in a portfolio of assets). In one or more embodiments, the edge devices 161a-161n are associated with the portfolio of assets. For instance, in one or more embodiments, the edge devices 161a-161n include one or more assets in a portfolio of assets. The edge devices 161a-161n include, in one or more embodiments, one or more databases, one or more assets (e.g., one or more building assets, one or more industrial assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more air handler units, one or more HVAC components, industrial equipment, factory equipment, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and an asset performance management system via the network 110. In one or more embodiments, the edge devices 161a-161n are associated with an industrial environment (e.g., a plant, etc.). Additionally or alternatively, in one or more embodiments, the edge devices 161a-161n are associated with components of the edge 115 such as, for example, one or more enterprises 160a-160n.

In one or more embodiments, the request component 304 receives the request 320 in response to execution of a mobile application via a user computing device. Additionally or alternatively, in one or more embodiments, the request component 304 receives the request 320 in response to execution of a user authentication process via a user computing device. For example, in an embodiment, the user authentication process is associated with password entry, facial recognition, biometric recognition, security key exchange, and/or another security technique associated with a user computing device. In another embodiment, the request component 304 receives the request 320 in response to one or more faults associated with the one or more assets in the portfolio of assets.

In one or more embodiments, the request 320 includes one or more fault descriptors that describes the one or more faults associated with the one or more assets. In one or more embodiments, the request 320 additionally or alternatively includes one or more asset descriptors that describe the one or more assets in the portfolio of assets. For instance, in one or more embodiments, the request 320 includes one or more asset descriptors that describe the edge devices 161a-161n. An asset descriptor includes, for example, an asset name, an asset identifier, an asset level and/or other information associated with an asset.

In certain embodiments, the portfolio of assets is associated with one or more asset zones (e.g., one or more zones in a building, etc.) that respectively include one or more assets. In certain embodiments, the portfolio of assets is a portfolio of SCADA systems. A SCADA system is a control system that includes one or more assets configured for networked communications and/or real-time control logic. For example, a SCADA system is configured for data acquisition, networked data communication, data presentation, monitoring, and/or control of one or more assets. In certain embodiments, a SCADA system is configured with one or more graphical user interfaces (e.g., one or more human machine interfaces) to facilitate management of the one or more systems. In certain embodiments, a SCADA system includes one or more controllers (e.g., one or more programmable logic controllers, one or more remote terminal units, one or more proportional integral derivative controllers, etc.) to facilitate control of the one or more assets. In certain embodiments, one or more events of a SCADA system stored in one or more log files. In certain embodiments, a SCADA system is associated with a location. In certain embodiments, the enterprise 160a is a first SCADA system, the enterprise 160b is a second SCADA system, etc. In certain embodiments, the asset descriptor is a SCADA system descriptor. For example, in certain embodiments, the asset descriptor includes a SCADA system asset name, a SCADA system identifier, a SCADA system level and/or other information associated with a SCADA system.

Additionally or alternatively, in one or more embodiments, the request 320 includes one or more user identifiers describing a user role for a user associated with generation of the request 320 and/or access of a dashboard visualization. A user identifier includes, for example, an identifier for a user role name (e.g., a manager, an executive, a maintenance engineer, a process engineer, etc.). Additionally or alternatively, in one or more embodiments, the request 320 includes one or more metrics context identifiers describing context for the metrics. A metrics context identifier includes, for example, an identifier for a plant performance metric, an asset performance metric, a goal (e.g., review production related to one or more assets, etc.). Additionally or alternatively, in one or more embodiments, the request 320 includes a time interval identifier describing an interval of time for the metrics. A time interval identifier describes, for example, an interval of time for aggregated data such as hourly, daily, monthly, yearly etc. In one or more embodiments, a time interval identifier is a reporting time identifier describing an interval of time for the metrics.

In one or more embodiments, in response to the request 320, the KPI modeling component 306 is configured to determine a first risk level associated with the one or more faults. The KPI modeling component 306 determines the risk level based on the one or more fault descriptors, the one or more asset descriptors, the one or more user identifiers, the one or more metrics context identifiers, and/or the time interval identifier. Additionally, the KPI modeling component 306 determines the risk level based on asset data associated with the one or more assets.

In an embodiment, at least a portion of the asset data is associated with the edge devices 161a-161n. For example, in one or more embodiments, at least a portion of the asset data includes, for example, connected building data, sensor data, real-time data, live property value data, event data, process data, operational data, fault data, asset data, location data, and/or other data associated with the edge devices 161a-161n. Additionally or alternatively, in one or more embodiments, at least a portion of the asset data includes historical data, historical connected building data, historical sensor data, historical property value data, historical event data, historical process data, historical operational data, historical fault data, historical asset data, and/or other historical data associated with the edge devices 161a-161n.

Additionally or alternatively, at least a portion of the asset data includes an aggregation of metrics and/or statistics associated with the aggregation of the asset data. For example, in certain embodiments, at least a portion of the asset data includes KPI data associated with the portfolio of assets. In one or more embodiments, the KPI data includes KPI metric data, duty KPI data, duty target KPI data, and/or other KPI data. In one or more embodiments, at least a portion of the asset data is obtained from one or more asset databases in communication with an asset performance management server system 302. For example, in certain embodiments, at least a portion of the asset data is obtained from an asset database 324. Additionally or alternatively, in certain embodiments, at least a portion of the performance assurance data 322 is obtained directly from the edge devices 161a-161n.

In one or more embodiments, the asset performance management server system 502 aggregates asset data associated with the edge devices 161a-161n into an asset database 324. The asset database 324 is a cache memory (e.g., a database structure) that dynamically stores the data associated with the edge devices 161a-161n based on interval of time and/or asset hierarchy level. For instance, in one or more embodiments, the asset database 324 stores the asset data associated with the edge devices 161a-161n for one or more intervals of time (e.g., 1 minute to 12 minutes, 1 hour to 24 hours, 1 day to 31 days, 1 month to 12 months, etc.) and/or for one or more asset hierarchy levels (e.g., asset level, asset zone, building level, building zone, plant level, plant zone, industrial site level, etc.). In a non-limiting embodiment, the asset database 324 stores the asset data associated with the edge devices 161a-161n for a first interval of time (e.g., 1 hour to 24 hours minutes) for a first asset (e.g., a first asset hierarchy level), for a second interval of time (e.g., 1 day to 31 days) for the first asset, and for a third interval of time (e.g., 1 month to 12 months) for the first asset. Furthermore, in the non-limiting embodiment, the asset database 324 stores the asset data associated with the edge devices 161a-161n for the first interval of time (e.g., 1 hour to 24 hours minutes) for all assets in a connected building (e.g., a second asset hierarchy level), for the second interval of time (e.g., 1 day to 31 days) for all the assets in the connected building, and for the third interval of time (e.g., 1 month to 12 months) for the all the assets in the connected building.

In one or more embodiments, the asset performance management server system 502 repeatedly updates asset data of the asset database 324 based on the asset data provided by the edge devices 161a-161n during the one or more intervals of time associated with the asset database 324. For instance, in one or more embodiments, the asset performance management server system 502 stores new asset data and/or modified asset data associated with the edge devices 161a-161n. In one or more embodiments, the asset performance management server system 502 repeatedly scans the edge devices 161a-161n to determine new asset data for storage in the asset database 324. In one or more embodiments, the asset performance management server system 502 formats one or more portions of the asset data associated with the edge devices 161a-161n. For instance, in one or more embodiments, the asset performance management server system 502 provides a formatted version of the asset data associated with the edge devices 161a-161n to the asset database 324. In an embodiment, the formatted version of the asset data 314 is formatted with one or more defined formats associated with the one or more intervals of time and/or the one or more asset hierarchy levels. A defined format is, for example, a structure for data fields of the asset database 324. In various embodiments, the formatted version of the asset data associated with the edge devices 161a-161n is stored in the asset database 324.

Additionally, the KPI modeling component 306 determines a second risk level associated with the one or more faults based on a KPI model 326. The KPI model 326 provides performance assurance modeling for the portfolio of assets. In one or more embodiments, the KPI model 326 employs one or more predetermined relationships between faults and asset performance indicator thresholds to determine criticality of the one or more faults. In one or more embodiments, the KPI model 326 the one or more predetermined relationships are determined based on impact with respect to asset performance, predictive maintenance, energy optimization, safety, health, and/or occupant comfort. For example, in one or more embodiments, the KPI model provides dynamic priorities for faults so that the faults are addressed based on current impact with respect to the performance indicator thresholds. The performance indicator thresholds are, for example, KPI performance thresholds related to asset performance, predictive maintenance, energy optimization, safety, health, and/or occupant comfort. In certain embodiments, at least a portion of the KPI model 326 includes contextual data that provides context (e.g., contextual awareness) associated with the portfolio of assets. In one or more embodiments, the contextual data includes information related to trends, patterns and/or relationships between faults and asset performance indicator thresholds. In one or more embodiments, one or more attributes for correlations between faults and asset performance indicator thresholds are associated with labels, classifications, insights, inferences, machine learning data and/or other attributes.

In one or more embodiments, the KPI model 326 is a machine learning model. For example, in one or more embodiments, the KPI model 326 identifies, classifies and/or predicts one or more context features associated with faults and asset performance indicator thresholds. In one or more embodiments, the KPI model 326 is configured as a deep neural network trained for KPI performance assurance modeling. In one or more embodiments, the KPI model 326 employs fuzzy logic, a Bayesian network, a Markov logic network and/or another type of machine learning technique to determine relationships between faults and asset performance indicator thresholds. In certain embodiments, the KPI model 326 determines relationships between faults and asset performance indicator thresholds based on respective annotations and/or labels. For example, in certain embodiments, the KPI model 326 determine at determines relationships between faults and asset performance indicator thresholds based on respective annotations and/or labels for asset properties, asset locations, asset sites, asset details, asset activities, asset functionalities, asset configurations, asset components, asset services, asset priorities and/or other asset information for respective assets in the portfolio of assets.

The performance assurance component 308 generates performance assurance data 322 based on the performance assurance modeling provided by the KPI modeling component 306. In one or more embodiments, the performance assurance component 308 generates one or more performance assurance insights related to the one or more assets based on a comparison between the first risk level and the second risk level. For instance, the performance assurance component 308 can update the KPI model 326 in response to a determination that the first risk level is different than the second risk level. In certain embodiments, the performance assurance component 308 modifies a predetermined relationship from the one or more predetermined relationships (e.g., a predetermined relationship associated with the KPI model 326) in response to a determination that the first risk level is different than the second risk level. In certain embodiments, the performance assurance component 308 updates the KPI model 326 to generate an updated version of the KPI model 326 in response to a determination that the first risk level is different than the second risk level. Furthermore, in certain embodiments, the KPI modeling component 306 employs the updated KPI model 326 in response to a new request to generate one or more performance assurance insights related to the one or more assets. In certain embodiments, the performance assurance component 308 modifies a data matrix (e.g., a KPI/fault matrix) associated with the one or more predetermined relationships between the faults and the asset performance indicator thresholds in response to a determination that the first risk level is different than the second risk level. Additionally or alternatively, the performance assurance component 308 can perform one or more actions with respect to the one or more assets in response to a determination that the first risk level is different than the second risk level. In one or more embodiments, the performance assurance data 322 includes the one or more performance assurance insights.

In one or more embodiments, the performance assurance component 308 generates the performance assurance data 322 to facilitate providing a dashboard visualization associated with the performance assurance data 322. In one or more embodiments, the performance assurance component 308 transmits the performance assurance data 322 via the network 110. In certain embodiments, performance assurance component 308 incorporates encryption capabilities to facilitate encryption and/or decryption of one or more portions of the performance assurance data 322. In one or more embodiments, the network 110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In one or more embodiments, the performance assurance data 322 is configured based on the one or more fault descriptors, the one or more asset descriptors, the one or more user identifiers, the one or more metrics context identifiers, and/or the time interval identifier.

In an embodiment, the performance assurance data 322 comprises prioritized actions for the portfolio of assets. In one or more embodiments, the prioritized actions indicate which assets from the portfolio of assets should be serviced first. For example, in an embodiment, the prioritized actions indicate a first asset from the portfolio of assets that should be serviced first, a second asset from the portfolio of assets that should be serviced second, a third asset from the portfolio of assets that should be serviced third, etc. In one or more embodiments, the prioritized actions are configured as a list of prioritized actions for the portfolio of assets based on impact to the portfolio of assets. For instance, in one or more embodiments, the prioritized actions are ranked, based on impact of respective prioritized actions with respect to the portfolio of assets, to generate the list of the prioritized actions. In one or more embodiments, the prioritized actions for the portfolio of assets are grouped based on impact to the portfolio of assets and/or contextual data associated with the performance assurance data 322. For instance, in one or more embodiments, the prioritized actions for the portfolio of assets are grouped based on relationships, features, and/or attributes between the performance assurance data 322.

In certain embodiments, the performance assurance component 308 is configured to render a dashboard visualization associated with the portfolio of assets via an electronic interface of a user computing device. For instance, in one or more embodiments, the dashboard visualization is associated with the edge devices 161a-161n (e.g., the edge devices 161a-161n included in a portfolio of assets). In one or more embodiments, the dashboard visualization is configured to provide the prioritized actions for the portfolio of assets as respective interactive display elements via the electronic interface. An interactive display element is a portion of the dashboard visualization (e.g., a user-interactive electronic interface portion) that provides interaction with respect to a user of the user computing device. For example, in one or more embodiments, an interactive display element is an interactive display element associated with a set of pixels that allows a user to provide feedback and/or to perform one or more actions with resect to the dashboard visualization. In an embodiment, in response to interaction with an interactive display element, the dashboard visualization is dynamically altered to display one or more altered portions of the dashboard visualization associated with different visual data and/or different interactive display elements.

In one or more embodiments, the dashboard visualization associated with the performance assurance data 322 includes the list of the prioritized actions. In one or more embodiments, the dashboard visualization associated with the performance assurance data 322 includes the grouping of the prioritized actions for the portfolio of assets. In one or more embodiments, the dashboard visualization associated with the performance assurance data 322 includes contextual data associated with the portfolio of assets. In one or more embodiments, the dashboard visualization associated with the performance assurance data 322 includes metrics associated with the portfolio of assets. Additionally, in one or more embodiments, the dashboard visualization is configured to facilitate execution and/or initiation of one or more actions via the dashboard visualization based on the performance assurance data 322. In an embodiment, an action is executed and/or initiated via an interactive display element of the dashboard visualization. In certain embodiments, an action from the one or more actions includes generating one or more notifications associated with the prioritized actions for the portfolio of assets. In certain embodiments, an action from the one or more actions includes providing an optimal process condition for an asset associated with the performance assurance data 322. For example, in certain embodiments, an action from the one or more actions includes adjusting a set-point and/or a schedule for an asset associated with the performance assurance data 322. In certain embodiments, an action from the one or more actions includes executing and/or initiating one or more corrective action to take for an asset associated with the performance assurance data 322. In certain embodiments, an action from the one or more actions includes providing an optimal maintenance option for an asset associated with the performance assurance data 322. In certain embodiments, an action from the one or more actions includes an action associated with the application services layer 225, the applications layer 230, and/or the core services layer 235.

Figure 4:
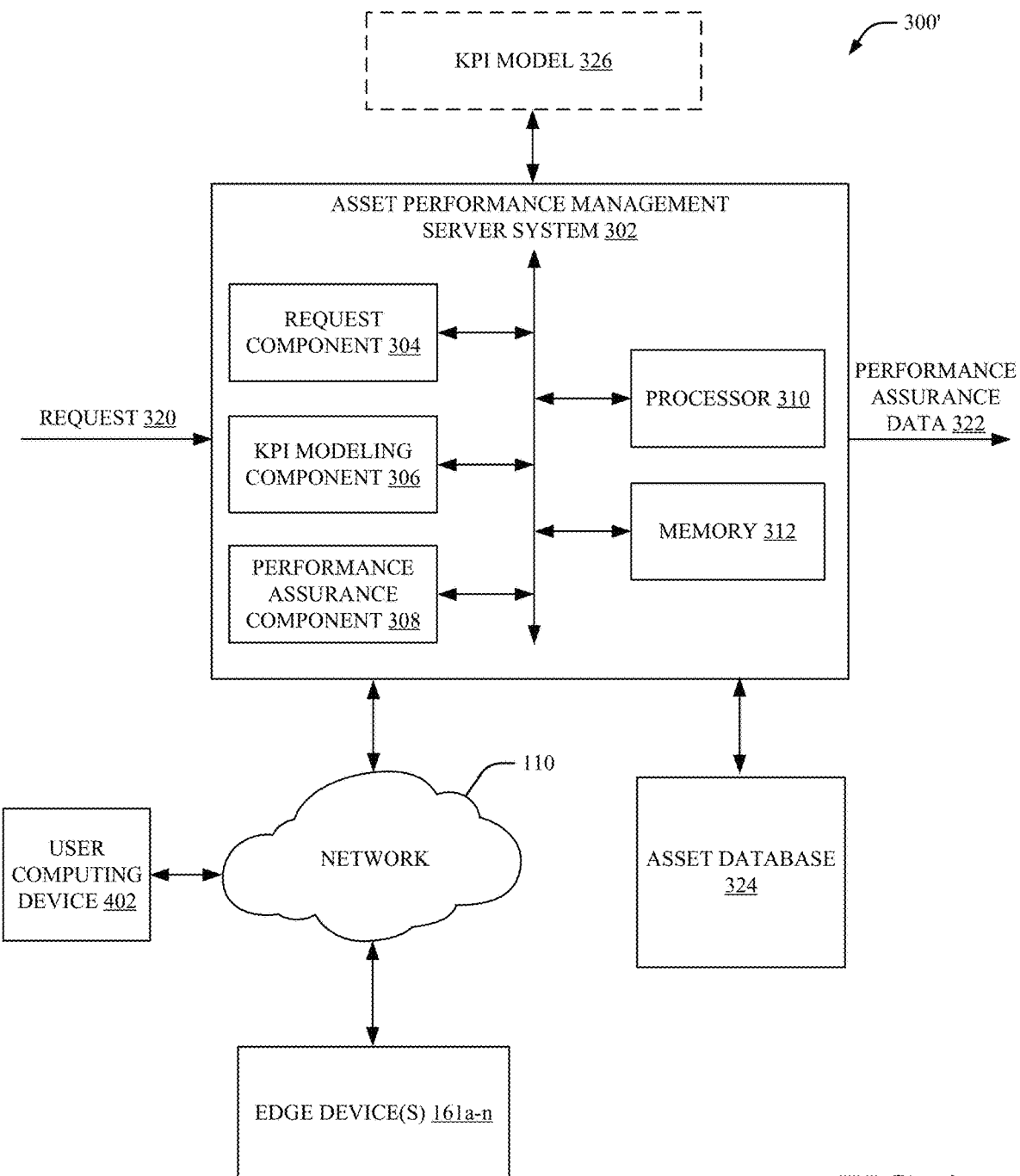
FIG. 4 illustrates another system that provides an exemplary environment, in accordance with one or more embodiments described herein.

FIG. 4 illustrates a system 300' that provides an exemplary environment according to one or more described features of one or more embodiments of the disclosure. In an embodiment, the system 300' corresponds to an alternate embodiment of the system 300 shown in FIG. 3. According to an embodiment, the system 300' includes the asset performance management server system 302, the edge devices 161a-161n, the asset database 324 and/or a computing device 402. In one or more embodiments, the asset performance management server system 302 is in communication with the edge devices 161a-161n and/or the computing device 402 via the network 110. The computing device 402 is a mobile computing device, a smartphone, a tablet computer, a mobile computer, a desktop computer, a laptop computer, a workstation computer, a wearable device, a virtual reality device, an augmented reality device, or another type of computing device located remote from the enterprise data management computer system 302. In one or more embodiments, the computing device 402 generates the request 320. For example, in one or more embodiments, the request 320 is generated via a visual display (e.g., a user interface) of the computing device 402. In another embodiment, the request 320 is generated via one or more microphones of the computing device 402 and/or one or more microphones communicatively coupled to the computing device 402. In another embodiment, the request 320 is generated via the edge devices 161a-161n and/or a processing device (e.g., a controller) communicatively coupled to the edge devices 161a-161n.

In one or more embodiments, the performance assurance component 308 communicates the performance assurance data 322 to the computing device 402. For example, in one or more embodiments, the performance assurance data 322 includes one or more visual elements for a visual display (e.g., a user-interactive electronic interface) of the computing device 402 that renders a visual representation of the one or more performance assurance insights. In one or more other embodiments, the performance assurance component 308 transmits the performance assurance data 322 to the edge devices 161a-161n and/or a processing device (e.g., a controller) communicatively coupled to the edge devices 161a-161n to, for example, alter one or more settings and/or one or more processes for the one or more assets. In one or more embodiments, the performance assurance data 322 includes one or more visual elements for a visual display (e.g., a user-interactive electronic interface) of the computing device 402 that renders a visual representation of prioritized actions for the one or more assets. In certain embodiments, the visual display of the computing device 402 displays one or more graphical elements associated with the performance assurance data 322. In another example, in one or more embodiments, the performance assurance data 322 includes one or notifications associated with the one or more performance assurance insights and/or the prioritized actions for the portfolio of assets. In one or more embodiments, the performance assurance data 322 allows a user associated with the computing device 402 to make decisions and/or perform one or more actions with respect to the one or more assets. In one or more embodiments, the performance assurance data 322 allows a user associated with the computing device 402 to control the one or more portions of the one or more assets (e.g., one or more portions of the edge devices 161a-161n). In one or more embodiments, the performance assurance data 322 allows a user associated with the computing device 402 to generate one or more work orders for the one or more assets.

Figure 5:
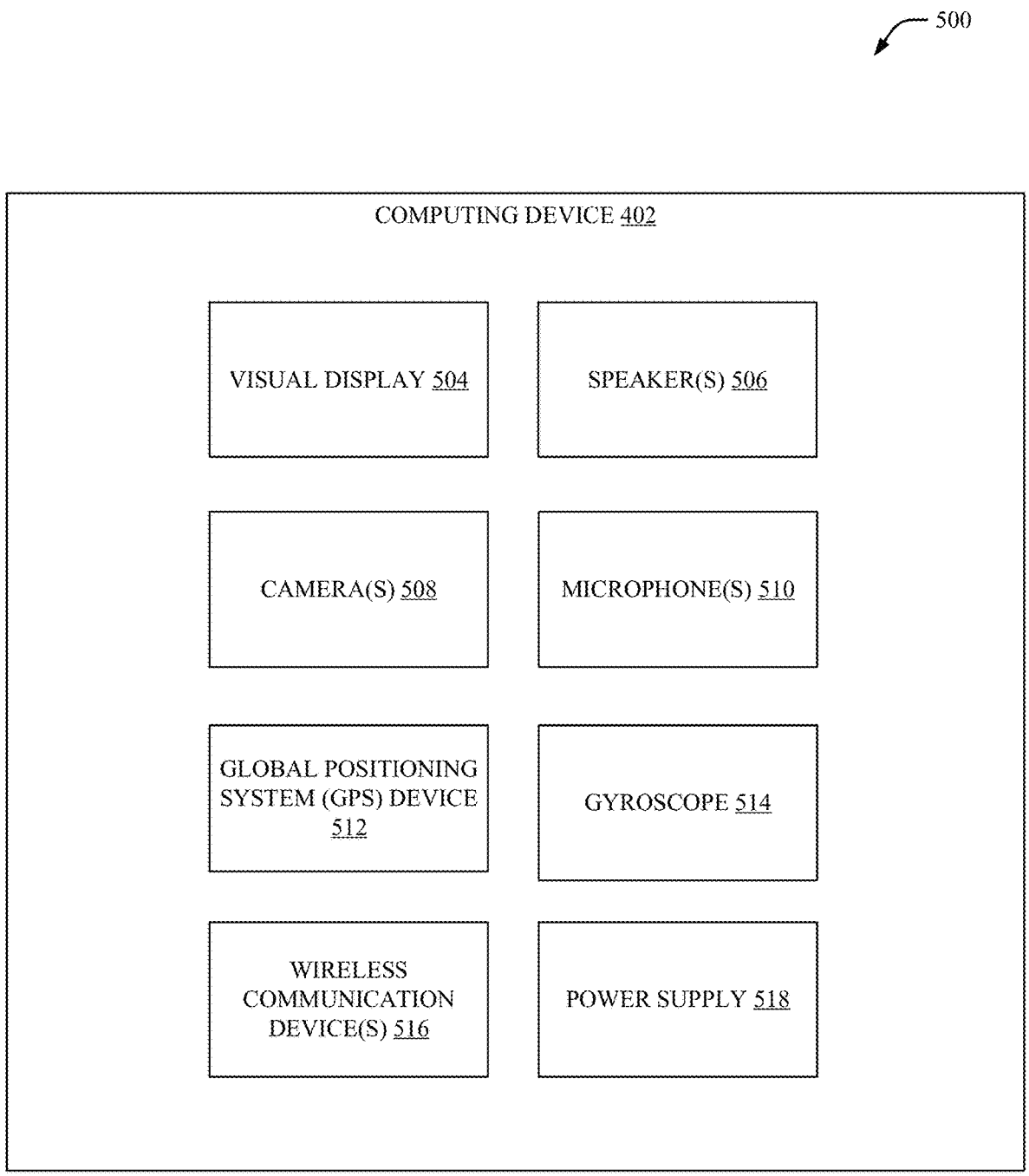
FIG. 5 illustrates an exemplary computing device, in accordance with one or more embodiments described herein.

FIG. 5 illustrates a system 500 according to one or more embodiments of the disclosure. The system 500 includes the computing device 402. In one or more embodiments, the computing device 402 employs mobile computing, augmented reality, cloud-based computing, IoT technology and/or one or more other technologies to provide performance data, video, audio, text, graphs, charts, real-time data, graphical data, one or more communications, one or more messages, one or more notifications, and/or other media data associated with the one or more performance assurance insights. The computing device 402 includes mechanical components, electrical components, hardware components and/or software components to facilitate determining performance assurance insights with respect to one or more assets. In the embodiment shown in FIG. 5, the computing device 402 includes a visual display 504, one or more speakers 506, one or more cameras 508, one or more microphones 510, a global positioning system (GPS) device 512, a gyroscope 514, one or more wireless communication devices 516, and/or a power supply 518.

In an embodiment, the visual display 504 is a display that facilitates presentation and/or interaction with one or more portions of dashboard visualization data. In one or more embodiments, the computing device 402 displays an electronic interface (e.g., a graphical user interface) associated with the asset performance management server system 302. In one or more embodiments, the visual display 504 is a visual display that renders one or more interactive media elements via a set of pixels. The one or more speakers 506 include one or more integrated speakers that project audio. The one or more cameras 508 include one or more cameras that employ autofocus and/or image stabilization for photo capture and/or real-time video. In certain embodiments, the one or more microphones 510 include one or more digital microphones that employ active noise cancellation to capture audio data. The GPS device 512 provides a geographic location for the computing device 402. The gyroscope 514 provides an orientation for the computing device 402. The one or more wireless communication devices 516 includes one or more hardware components to provide wireless communication via one or more wireless networking technologies and/or one or more short-wavelength wireless technologies. The power supply 518 is, for example, a power supply and/or a rechargeable battery that provides power to the visual display 504, the one or more speakers 506, the one or more cameras 508, the one or more microphones 510, the GPS device 512, the gyroscope 514, and/or the one or more wireless communication devices 516. In certain embodiments, the performance assurance data 322 associated with the one or more performance assurance insights related to the one or more assets is presented via the visual display 504 and/or the one or more speakers 506.

Figure 6:
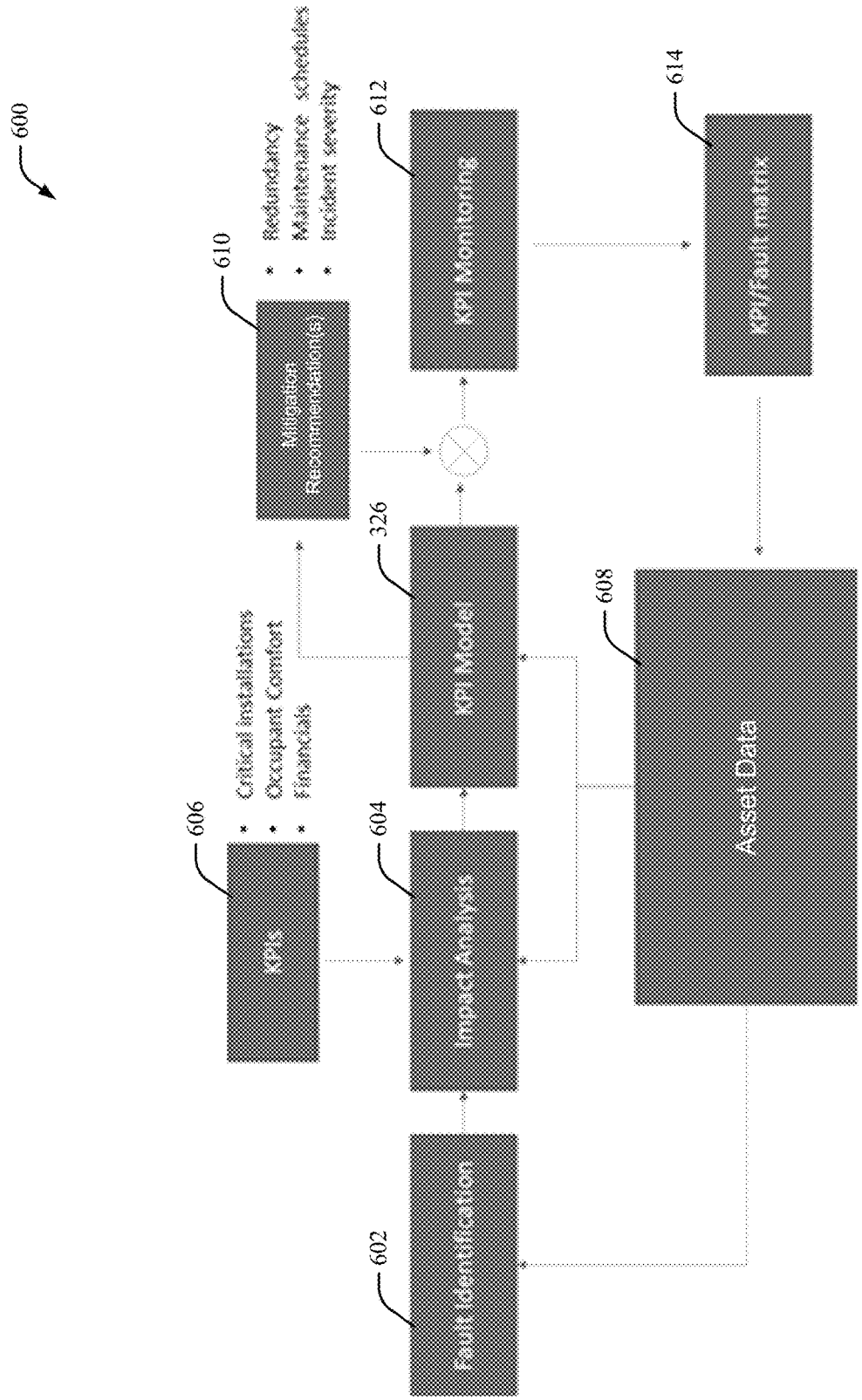
FIG. 6 illustrates a system associated with performance assurance modeling, in accordance with one or more embodiments described herein.

FIG. 6 illustrates a system 600 associated with performance assurance modeling according to one or more described features of one or more embodiments of the disclosure. In one or more embodiments, the system 500 illustrates performance assurance modeling associated with the KPI model 326. In one or more embodiments, fault identification 602 initiates the performance assurance modeling. The fault identification 602 is related to identification of one or more faults associated with one or more assets. In response to the fault identification 602, impact analysis 604 is performed to predict an impact of the one or more faults with respect to the one or more assets. In one or more embodiments, the impact analysis 604 determines a first risk level associated with the one or more faults based on asset data 608 and/or KPIs 606.

The asset data 608 is generated based on monitoring of the one or more assets and/or one or more processes performed by the one or more assets. In an embodiment, at least a portion of the asset data 608 is associated with the edge devices 161a-161n. For example, in one or more embodiments, at least a portion of the asset data 608 includes, for example, connected building data, sensor data, real-time data, live property value data, event data, process data, equipment data, operational data, fault data, asset data, location data, and/or other data associated with the edge devices 161a-161n. Additionally or alternatively, in one or more embodiments, at least a portion of the asset data 604 includes historical data, historical connected building data, historical sensor data, historical property value data, historical event data, historical process data, historical equipment data, historical operational data, historical fault data, historical asset data, and/or other historical data associated with the edge devices 161a-161n. The KPIs 606 includes a set of performance indicator thresholds related to installation criteria for the one or more assets, occupant comfort criteria related to an environment for the one or more assets, financial criteria associated with the one or more assets, performance criteria associated with the one or more assets, predictive maintenance criteria associated with the one or more assets, energy optimization criteria associated with the one or more assets, safety criteria associated with the one or more assets, health criteria associated with the one or more assets, and/or other criteria associated with the one or more assets. Additionally or alternatively, at least a portion of the KPIs 606 includes an aggregation of metrics and/or statistics associated with assets. For example, in certain embodiments, the KPIs 606 includes KPI metric data, duty KPI data, duty target KPI data, and/or other KPI data.

The KPI model 326 determines a second risk level associated with the one or more faults based on one or more predetermined relationships between historical faults and predetermined asset performance indicator thresholds. In certain embodiments, the KPI model 326 employs the asset data 608 and/or information from the impact analysis 604 to determine the second risk level. In certain embodiments, the KPI model 326 generates one or more mitigation recommendations 610 to mitigate the one or more faults. For instance, in certain embodiments, the one or more mitigation recommendations 610 are defense measures associated with redundancy (e.g., redundant operations), maintenance schedules, incident severity predictions, and/or one or more other defense measures to mitigate impact of the one or more faults with respect to the one or more assets. In one or more embodiments, output from the KPI model 326 and/or the one or more mitigation recommendations 610 are employed to perform further KPI monitoring 612 with respect to the one or more assets. The KPI monitoring 612 includes, for example, monitoring of the one or more assets and/or one or more processes performed by the one or more assets. In certain embodiments, the KPI monitoring 612 includes monitoring the one or more assets and/or one or more processes based on performance indicator thresholds. Additionally, based on the KPI monitoring 612, a KPI/fault matrix 614 is generated to manage relationships between faults and asset performance indicator thresholds. For instance, in one or more embodiments, the KPI/fault matrix 614 is a data structure (e.g., a data matrix) formatted to represent relationships between faults and asset performance indicator thresholds.

Figure 7:
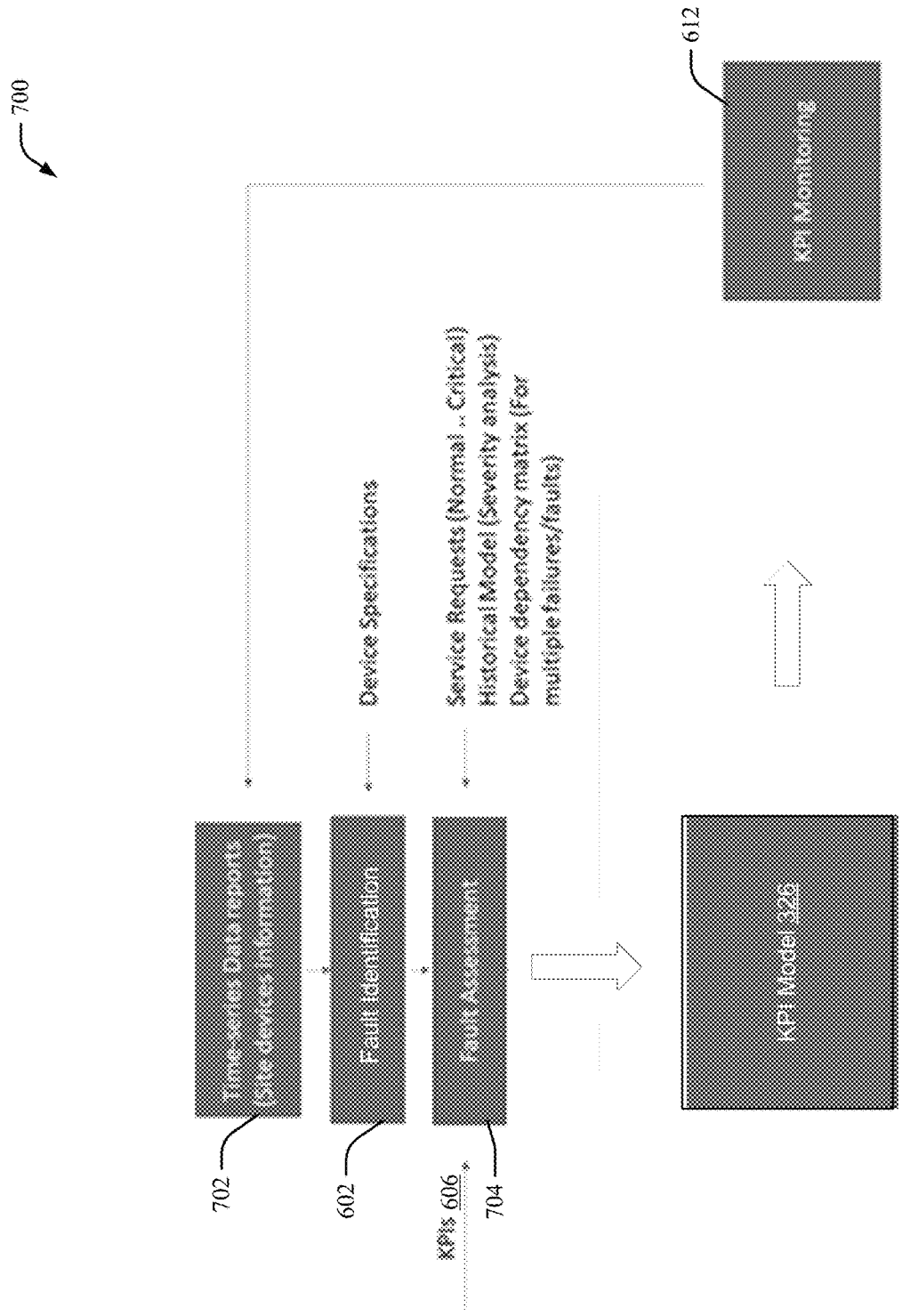
FIG. 7 illustrates a system associated with closed loop KPI model refinement, in accordance with one or more embodiments described herein.

FIG. 7 illustrates a system 700 associated with closed loop KPI model refinement according to one or more described features of one or more embodiments of the disclosure. For instance, in one or more embodiments, the system 700 illustrates an update process associated with the KPI model 326. In one or more embodiments, the fault identification 602 is based on time-series data reports 702 associated with the asset data 608. For example, in certain embodiments, at least a portion of the asset data 608 is structured as time-series data stored as time-series data reports within the asset database 324. In certain embodiments, the time-series data reports 702 includes site device information associated with the asset data 608. Additionally or alternatively, the fault identification 602 is based on device specifications for the one or more assets. For example, in one or more embodiments, the device specifications includes asset identifiers, process thresholds, asset configuration information, location data, processing specifications, memory specifications, input/output data specifications, temperature specifications, size specifications, weight specifications, humidity specifications, electrical specifications, and/or device specifications associated with the one or more assets. In one or more embodiments, the impact analysis 604 includes a fault assessment 704. The fault assessment 704 determines a risk level associated with the one or more faults based on the KPIs 606, service requests, historical model data, device dependency information, and/or other information. In one or more embodiments, the KPI model 326 employs the fault assessment 704 to determine one or more performance assurance insights related to the one or more assets and/or to facilitate the KPI monitoring 612.

Figure 8:
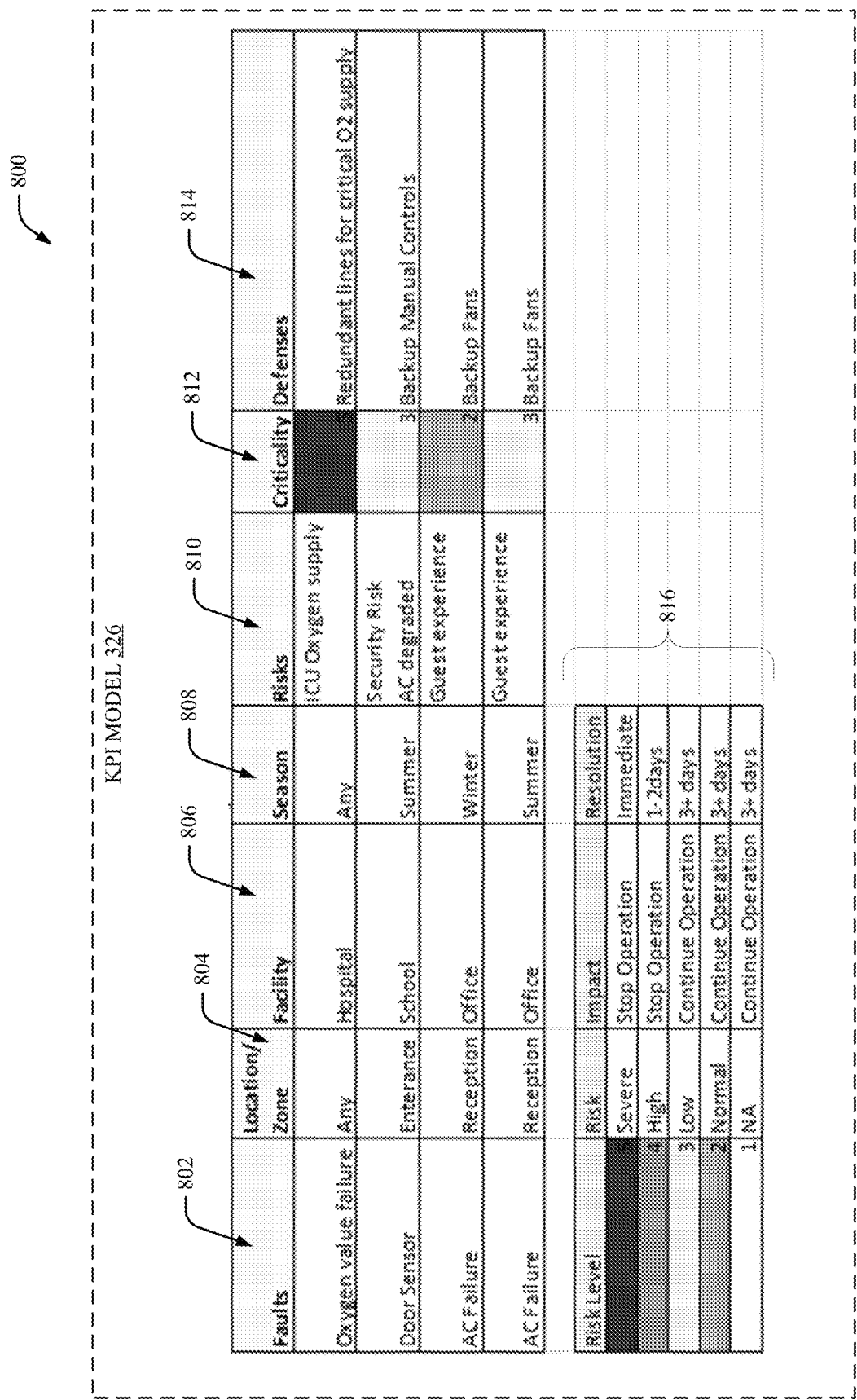
FIG. 8 illustrates a system associated with a KPI model, in accordance with one or more embodiments described herein.

FIG. 8 illustrates a system 800 associated with the KPI model 326 according to one or more described features of one or more embodiments of the disclosure. In one or more embodiments, the KPI model 326 employs predetermined relationships between faults and asset performance indicator thresholds to determine a risk level associated with a fault. For example, a fault 802 that corresponds to an oxygen value failure at any location 804 within a hospital facility 806 during any season 808 of the year can be associated with a risk 810 that corresponds to an ICU oxygen supply risk with a risk level 812 that corresponds to criticality level 5. A defense 814 for the fault 802 that corresponds to the oxygen value failure can provide a recommendation to provide redundant lines for critical oxygen supply. Additionally, the KPI model 326 employs impact analysis data 816 to generate performance assurance insights. For example, the impact analysis data 816 can indicate that a risk level for a fault that corresponds to level 5 can be a severe risk with an impact for the portfolio of assets resulting in operations stopping and an immediate resolution for the fault being required in order to maintain performance of the portfolio of assets with respect to performance indicator thresholds.

Figure 9:
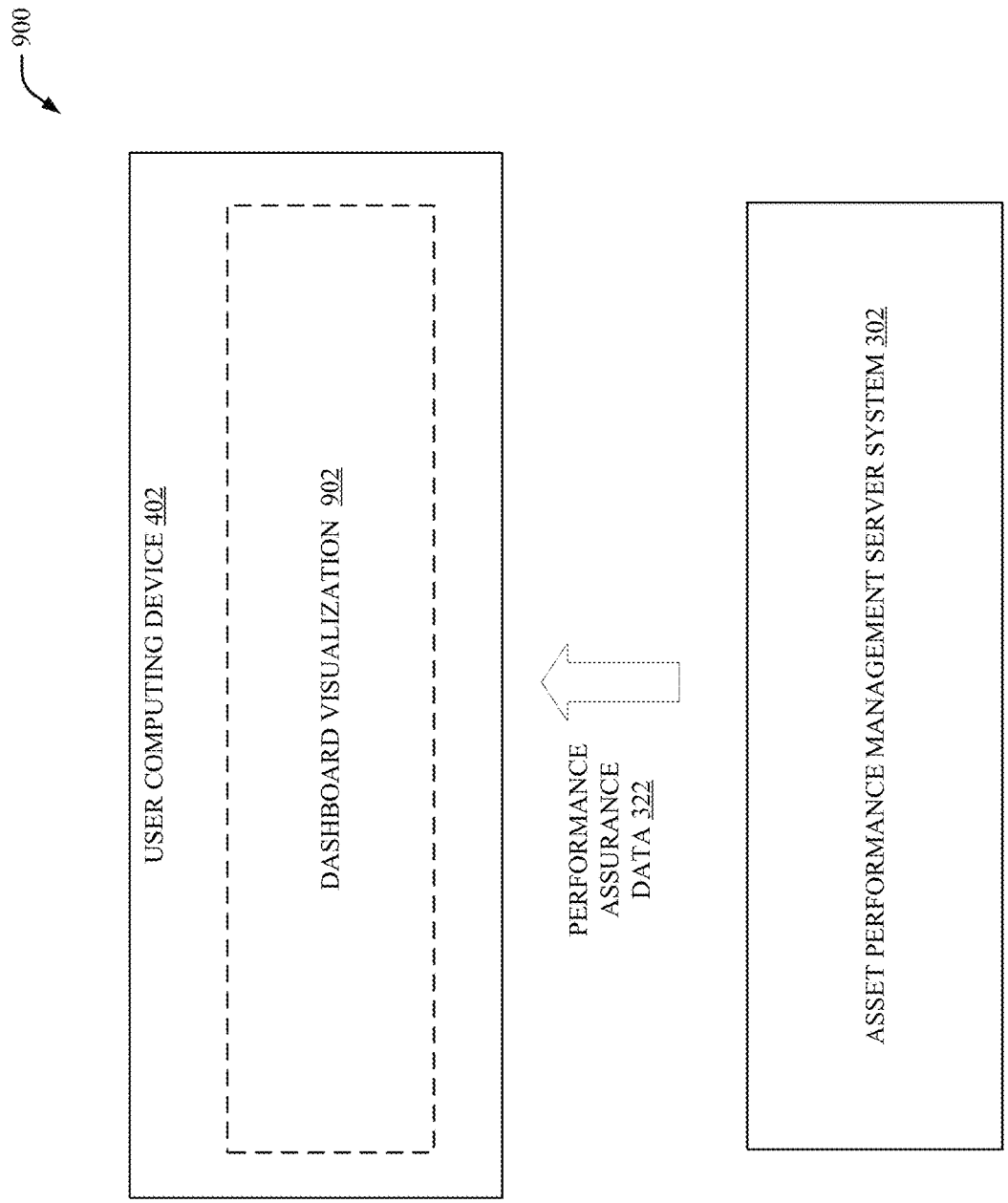
FIG. 9 illustrates an exemplary system associated a dashboard visualization, in accordance with one or more embodiments described herein.

FIG. 9 illustrates a system 900 that provides another exemplary environment according to one or more described features of one or more embodiments of the disclosure. According to an embodiment, the system 900 includes the asset performance management server system 302. The asset performance management server system 302 is associated with one or more application products such as an asset management platform, an asset performance platform, a global operations platform, a site operations platform, an industrial asset platform, an industrial process platform, a digital worker platform, an energy and sustainability platform, a healthy buildings platform, an energy optimization platform, a predictive maintenance platform, a centralized control platform, and/or another type of asset platform. In one or more embodiments, the asset performance management server system 302 receives the request 320. In certain embodiments, the asset performance management server system 302 receives the request 320 via the network 110. Additionally, in one or more embodiments, the asset performance management server system 302 transmits the performance assurance data 322 to the user computing device 402. In certain embodiments, the asset performance management server system 302 transmits the performance assurance data 322 via the network 110.

FIG. 9 illustrates a system 900 according to one or more described features of one or more embodiments of the disclosure. In an embodiment, the system 900 includes the user computing device 402 and the asset performance management server system 302. In one or more embodiments, the user computing device 402 is configured to provide a dashboard visualization 902. In one or more embodiments, the dashboard visualization 902 is rendered via the visual display 504 of the user computer device 402. Furthermore, in certain embodiments, the asset performance management server system 302 is communicatively coupled to the edge devices 161a-161n and/or the asset database 504. In certain embodiments, the dashboard visualization 902 is associated with a dashboard visualization service (e.g., an asset performance management service). In one or more embodiments, the dashboard visualization 902 is associated with the application services layer 225. In one or more embodiments, the dashboard visualization 902 is accessible and/or implemented via the user computing device 402. In one or more embodiments, the dashboard visualization system 902 is configured to provide a dashboard visualization related to the one or more performance assurance insights for the portfolio of assets. In one or more embodiments, the asset performance management server system 302 is configured to provide the performance assurance data 322 to the user computing device 402 to facilitate rendering of the dashboard visualization 702 related to the portfolio of assets.

Figure 10:
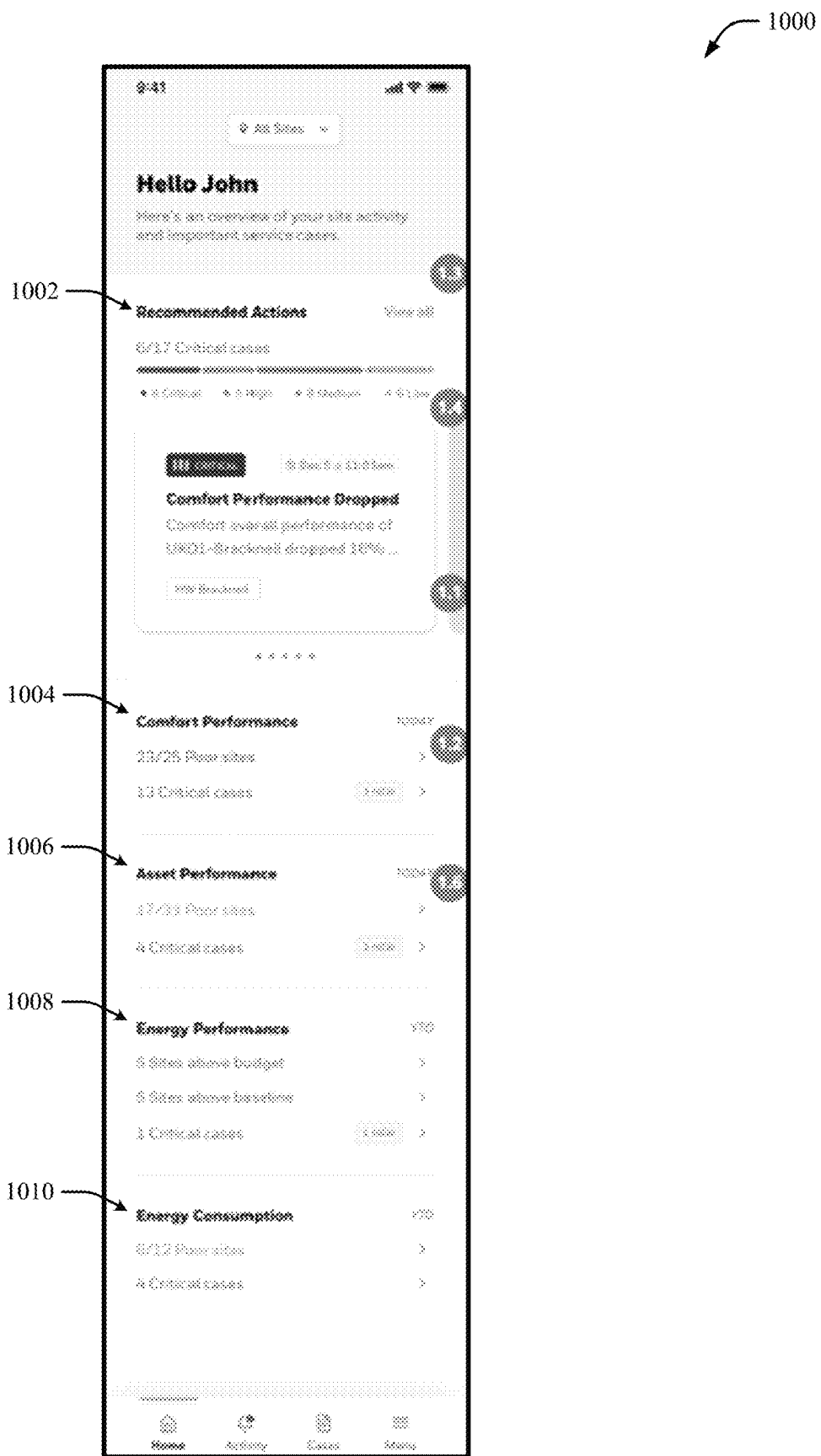
FIG. 10 illustrates an exemplary electronic interface, in accordance with one or more embodiments described herein.

FIG. 10 illustrates an exemplary electronic interface 1000 according to one or more embodiments of the disclosure. In an embodiment, the electronic interface 1000 is an electronic interface of the user computing device 402 that is presented via the visual display 504. In one or more embodiments, a dashboard visualization is rendered via the electronic interface 1000. In certain embodiments, the data visualization rendered via the electronic interface 1000 presents a visualization of one or more portions of the performance assurance data 322 for a portfolio of assets to facilitate analysis and/or management of the portfolio of assets via the dashboard visualization. In certain embodiments, the dashboard visualization rendered via the electronic interface 1000 presents recommended actions 1002 configured as prioritized actions for the portfolio of assets. In certain embodiments, the recommended actions 1002 are configured as respective interactive display elements via the electronic interface 1000. Additionally or alternatively, in certain embodiments, the dashboard visualization rendered via the electronic interface 1000 presents comfort performance data 1004 configured as notifications and/or respective interactive display elements associated with the portfolio of assets. Additionally or alternatively, in certain embodiments, the dashboard visualization rendered via the electronic interface 1000 presents asset performance data 1006 configured as notifications and/or respective interactive display elements associated with the portfolio of assets. Additionally or alternatively, in certain embodiments, the dashboard visualization rendered via the electronic interface 1000 presents energy performance data 1008 configured as notifications and/or respective interactive display elements associated with the portfolio of assets. Additionally or alternatively, in certain embodiments, the dashboard visualization rendered via the electronic interface 1000 presents energy consumption data 1010 configured as notifications and/or respective interactive display elements associated with the portfolio of assets.

Figure 11:
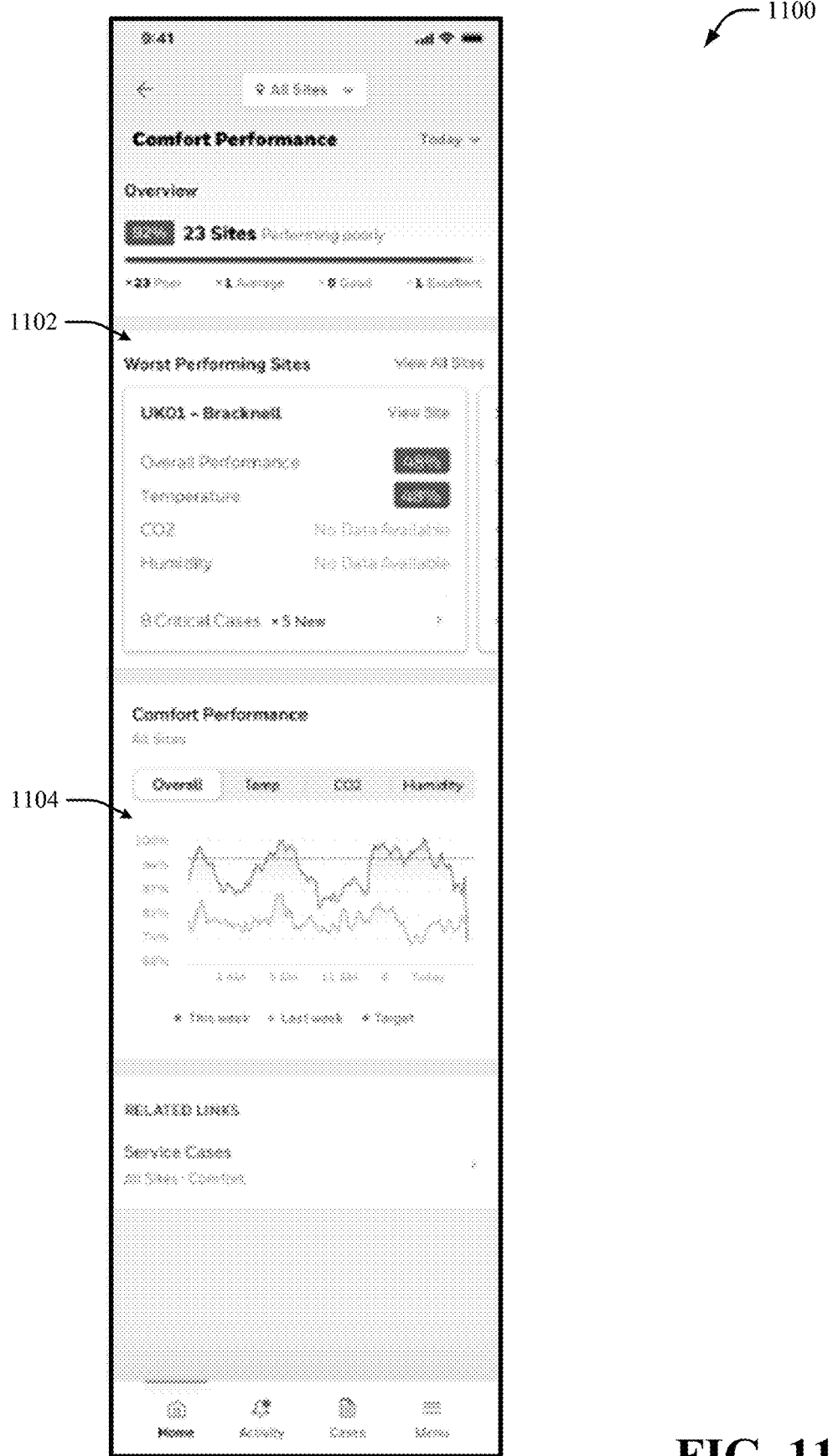
FIG. 11 illustrates another exemplary electronic interface, in accordance with one or more embodiments described herein.

FIG. 11 illustrates an exemplary electronic interface 1100 according to one or more embodiments of the disclosure. In an embodiment, the electronic interface 1100 is an electronic interface of the user computing device 402 that is presented via the visual display 504. In one or more embodiments, a dashboard visualization is rendered via the electronic interface 1100. In certain embodiments, the data visualization rendered via the electronic interface 1100 presents a visualization of one or more portions of the performance assurance data 322 for a portfolio of assets to facilitate analysis and/or management of the portfolio of assets via the dashboard visualization. In certain embodiments, the dashboard visualization rendered via the electronic interface 1100 presents comfort performance data for the portfolio of assets. In certain embodiments, the electronic interface 1100 is displayed in response to interaction with respect to an interactive display element associated with the comfort performance data 1004 presented via the electronic interface 1000. In certain embodiments, the electronic interface 1100 presents prioritized actions and/or metrics associated with comfort performance for the portfolio of assets. For example, in certain embodiments, the electronic interface presents site data 1102 associated with respective interactive display elements and/or respective metrics for respective asset sites. In certain embodiments, a ranking for presentation of respective interactive display elements and/or respective metrics for respective asset sites associated with the site data 1102 is determined based on respective asset data for respective assets at the asset sites. In certain embodiments, the electronic interface 1100 presents graphical data 1104 associated with respective comfort performance metrics for the respective asset sites.

Figure 12:
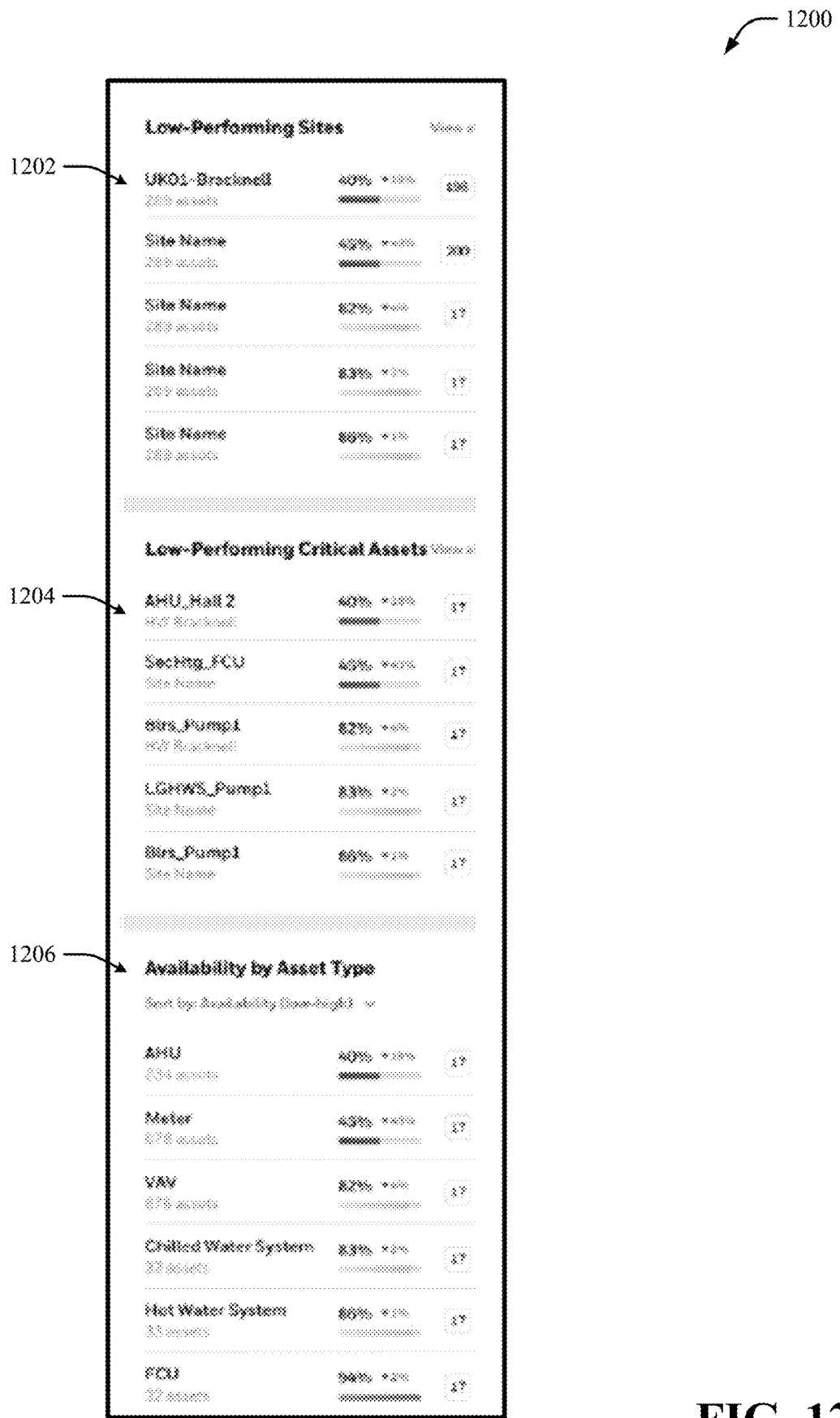
FIG. 12 illustrates another exemplary electronic interface, in accordance with one or more embodiments described herein.

FIG. 12 illustrates an exemplary electronic interface 1200 according to one or more embodiments of the disclosure. In an embodiment, the electronic interface 1200 is an electronic interface of the user computing device 402 that is presented via the visual display 504. In one or more embodiments, a dashboard visualization is rendered via the electronic interface 1200. In certain embodiments, the data visualization rendered via the electronic interface 1200 presents a visualization of one or more portions of the performance assurance data 322 for a portfolio of assets to facilitate analysis and/or management of the portfolio of assets via the dashboard visualization. In certain embodiments, the dashboard visualization rendered via the electronic interface 1200 presents site data for the portfolio of assets. In certain embodiments, the electronic interface 1200 is displayed in response to interaction with respect to an interactive display element associated with the site data 1102 presented via the electronic interface 1100. In certain embodiments, the electronic interface 1200 presents site data 1202 configured as a ranking of respective interactive display elements for respective asset sites associated with the portfolio of assets. Additionally or alternatively, in certain embodiments, the electronic interface 1200 presents asset data 1204 configured as a ranking of respective interactive display elements for respective assets associated with the portfolio of assets. Additionally or alternatively, in certain embodiments, the electronic interface 1200 presents asset type data 1206 configured as a ranking of respective interactive display elements for respective asset types associated with the portfolio of assets.

Figure 13:
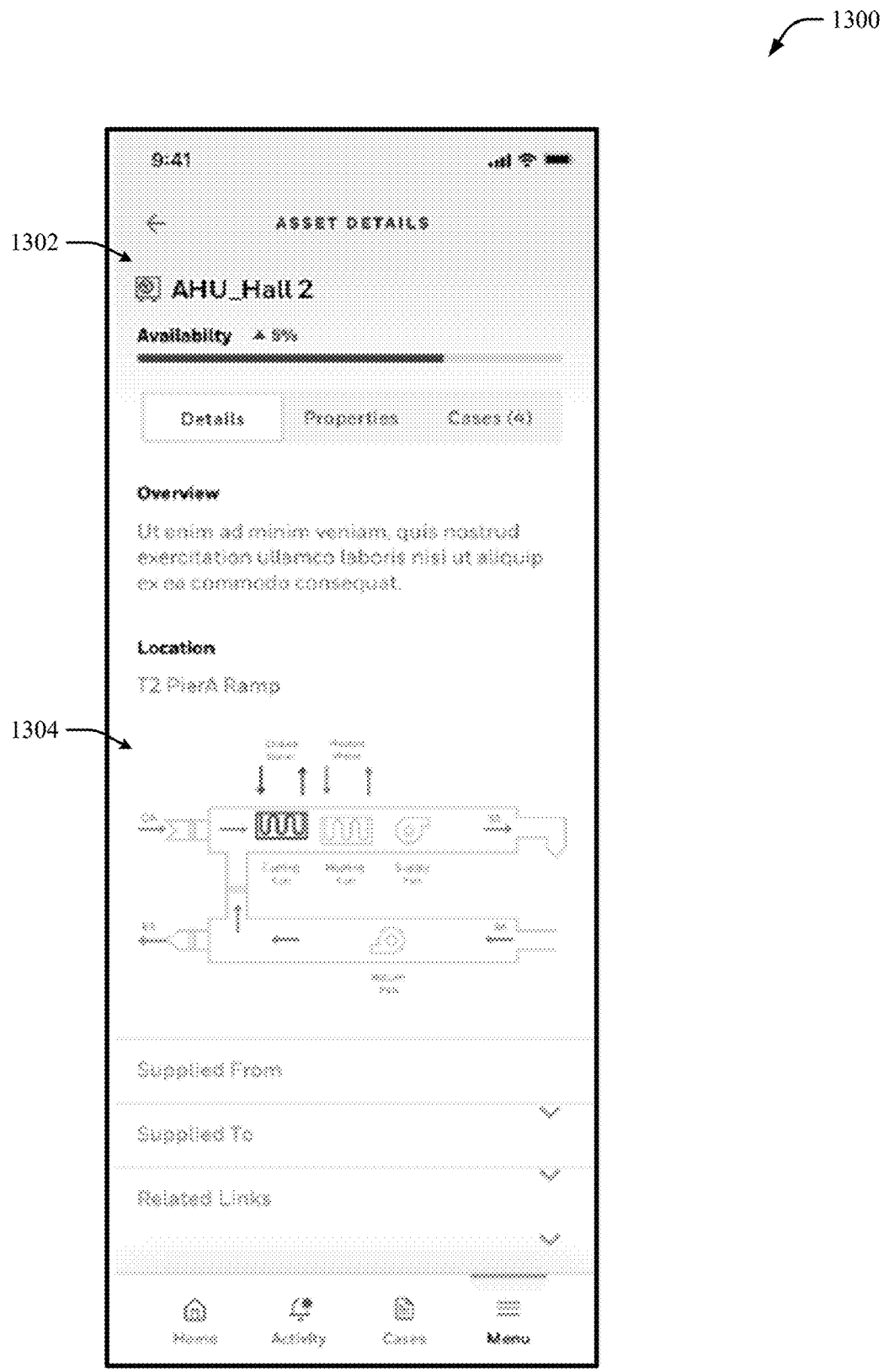
FIG. 13 illustrates another exemplary electronic interface, in accordance with one or more embodiments described herein.

FIG. 13 illustrates an exemplary electronic interface 1300 according to one or more embodiments of the disclosure. In an embodiment, the electronic interface 1300 is an electronic interface of the user computing device 402 that is presented via the visual display 504. In one or more embodiments, a dashboard visualization is rendered via the electronic interface 1300. In certain embodiments, the data visualization rendered via the electronic interface 1300 presents a visualization of one or more portions of the performance assurance data 322 for a portfolio of assets to facilitate analysis and/or management of the portfolio of assets via the dashboard visualization. In certain embodiments, the dashboard visualization rendered via the electronic interface 1300 presents asset detail data for the portfolio of assets. In certain embodiments, the electronic interface 1300 is displayed in response to interaction with respect to an interactive display element associated with the asset data 1204 presented via the electronic interface 1200. In certain embodiments, the electronic interface 1300 presents asset detail data 1302 configured to present metrics, contextual data, and/or configuration data for an asset associated with the portfolio of assets. Additionally or alternatively, in certain embodiments, the electronic interface 1300 presents digital twin data 1304 configured to present real-time asset modeling and/or predictive analysis for an asset associated with the portfolio of assets.

Figure 14:
FIG. 14 illustrates another exemplary electronic interface, in accordance with one or more embodiments described herein.

FIG. 14 illustrates an exemplary electronic interface 1400 according to one or more embodiments of the disclosure. In an embodiment, the electronic interface 1400 is an electronic interface of the user computing device 402 that is presented via the visual display 504. In one or more embodiments, a dashboard visualization is rendered via the electronic interface 1400. In certain embodiments, the data visualization rendered via the electronic interface 1400 presents a visualization of one or more portions of the performance assurance data 322 for a portfolio of assets to facilitate analysis and/or management of the portfolio of assets via the dashboard visualization. In certain embodiments, the dashboard visualization rendered via the electronic interface 1400 presents asset detail data for the portfolio of assets. In certain embodiments, the electronic interface 1400 is displayed in response to interaction with respect to an interactive display element associated with the asset data 1204 presented via the electronic interface 1200. In certain embodiments, the electronic interface 1400 presents asset detail data 1402 configured to present metrics, contextual data, and/or configuration data for an asset associated with the portfolio of assets. Additionally or alternatively, in certain embodiments, the electronic interface 1400 presents remote control data 1404 configured to facilitate remote control of an asset associated with the portfolio of assets. In certain embodiments, the remote control data 1404 includes one or more interactive display elements that facilitate modification of one or more set points for one or more portions of the asset associated with the portfolio of assets.

Figure 15:
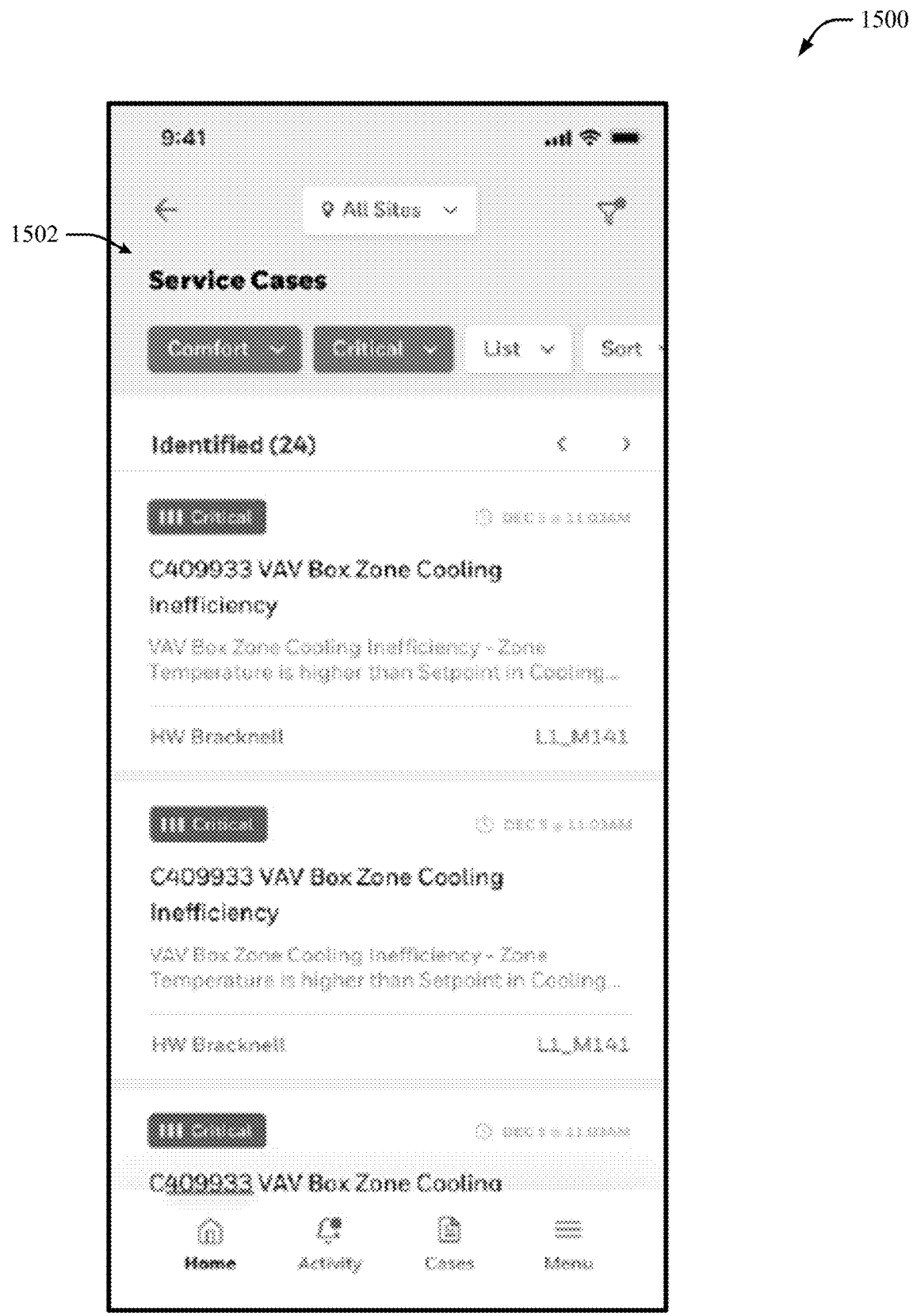
FIG. 15 illustrates another exemplary electronic interface, in accordance with one or more embodiments described herein.

FIG. 15 illustrates an exemplary electronic interface 1500 according to one or more embodiments of the disclosure. In an embodiment, the electronic interface 1500 is an electronic interface of the user computing device 402 that is presented via the visual display 504. In one or more embodiments, a dashboard visualization is rendered via the electronic interface 1500. In certain embodiments, the data visualization rendered via the electronic interface 1500 presents a visualization of one or more portions of the performance assurance data 322 for a portfolio of assets to facilitate analysis and/or management of the portfolio of assets via the dashboard visualization. In certain embodiments, the dashboard visualization rendered via the electronic interface 1500 presents asset detail data for the portfolio of assets. In certain embodiments, the electronic interface 1500 presents service case data 1502 configured to present one or more service actions for one or more assets from the portfolio of assets. In certain embodiments, the service case data 1502 is configured to facilitate generation of one or more service cases for one or more assets from the portfolio of assets.

Figure 16:
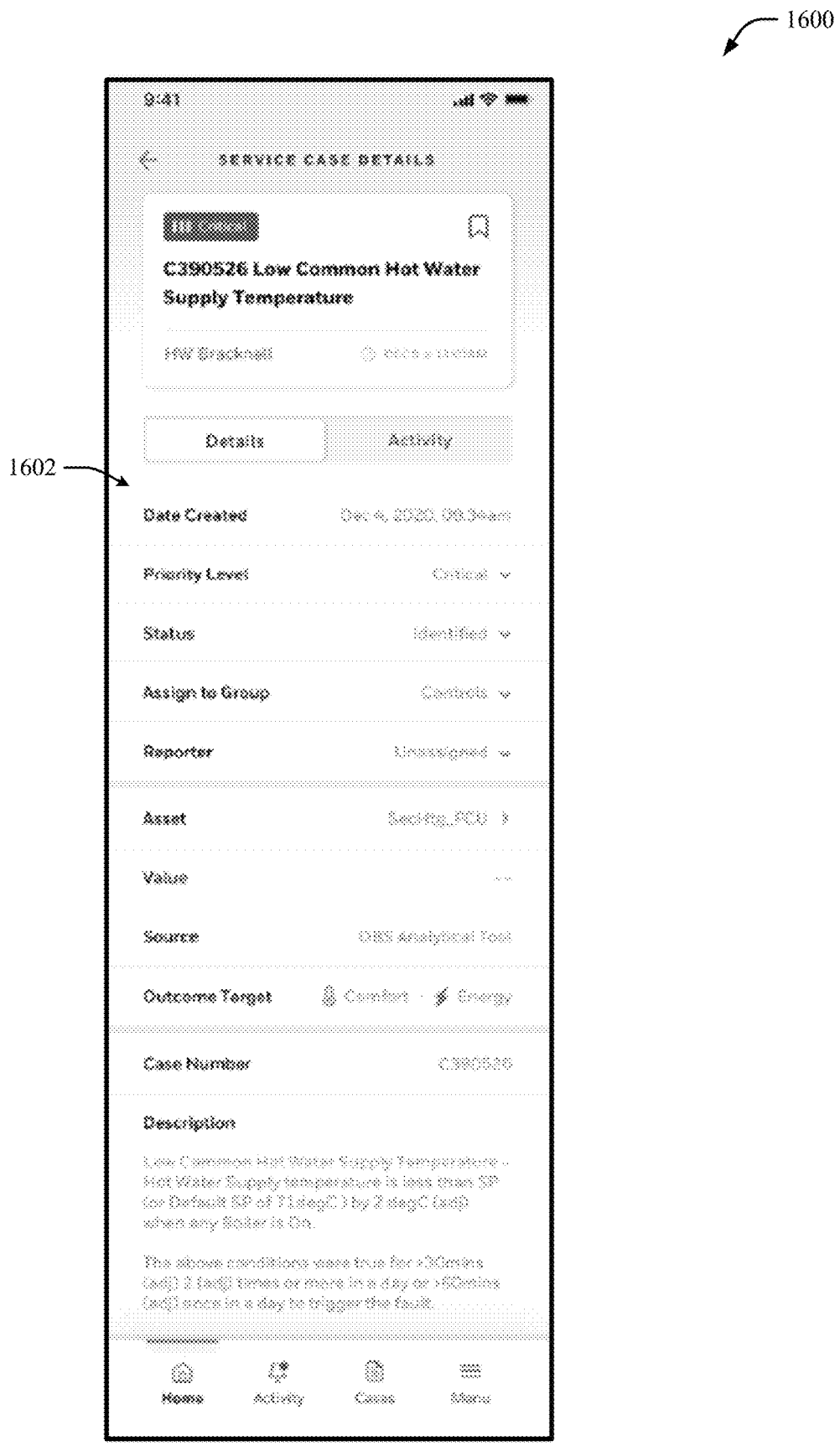
FIG. 16 illustrates another exemplary electronic interface, in accordance with one or more embodiments described herein.

FIG. 16 illustrates an exemplary electronic interface 1600 according to one or more embodiments of the disclosure. In an embodiment, the electronic interface 1600 is an electronic interface of the user computing device 402 that is presented via the visual display 504. In one or more embodiments, a dashboard visualization is rendered via the electronic interface 1600. In certain embodiments, the data visualization rendered via the electronic interface 1600 presents a visualization of one or more portions of the performance assurance data 322 for a portfolio of assets to facilitate analysis and/or management of the portfolio of assets via the dashboard visualization. In certain embodiments, the electronic interface 1600 is displayed in response to interaction with respect to an interactive display element associated with the service case data 1502 presented via the electronic interface 1500. In certain embodiments, the dashboard visualization rendered via the electronic interface 1600 presents asset detail data for the portfolio of assets. In certain embodiments, the electronic interface 1600 presents service case data 1602 configured to present one or more service details for one or more assets from the portfolio of assets. In certain embodiments, the service case data 1602 is configured to facilitate generation of one or more service cases for one or more assets from the portfolio of assets.

Figure 17:
FIG. 17 illustrates another exemplary electronic interface, in accordance with one or more embodiments described herein.

FIG. 17 illustrates an exemplary electronic interface 1700 according to one or more embodiments of the disclosure. In an embodiment, the electronic interface 1700 is an electronic interface of the user computing device 402 that is presented via the visual display 504. In one or more embodiments, a dashboard visualization is rendered via the electronic interface 1700. In certain embodiments, the data visualization rendered via the electronic interface 1700 presents a visualization of one or more portions of the performance assurance data 322 for a portfolio of assets to facilitate analysis and/or management of the portfolio of assets via the dashboard visualization. In certain embodiments, the electronic interface 1700 is displayed in response to interaction with respect to an interactive display element associated with the service case data 1502 presented via the electronic interface 1500. In certain embodiments, the dashboard visualization rendered via the electronic interface 1700 presents asset detail data for the portfolio of assets. In certain embodiments, the electronic interface 1700 presents service case data 1702 configured to present one or more service details for one or more assets from the portfolio of assets. In certain embodiments, the service case data 1702 is configured to present one or more communications related to one or more service cases for one or more assets from the portfolio of assets.

Figure 18:
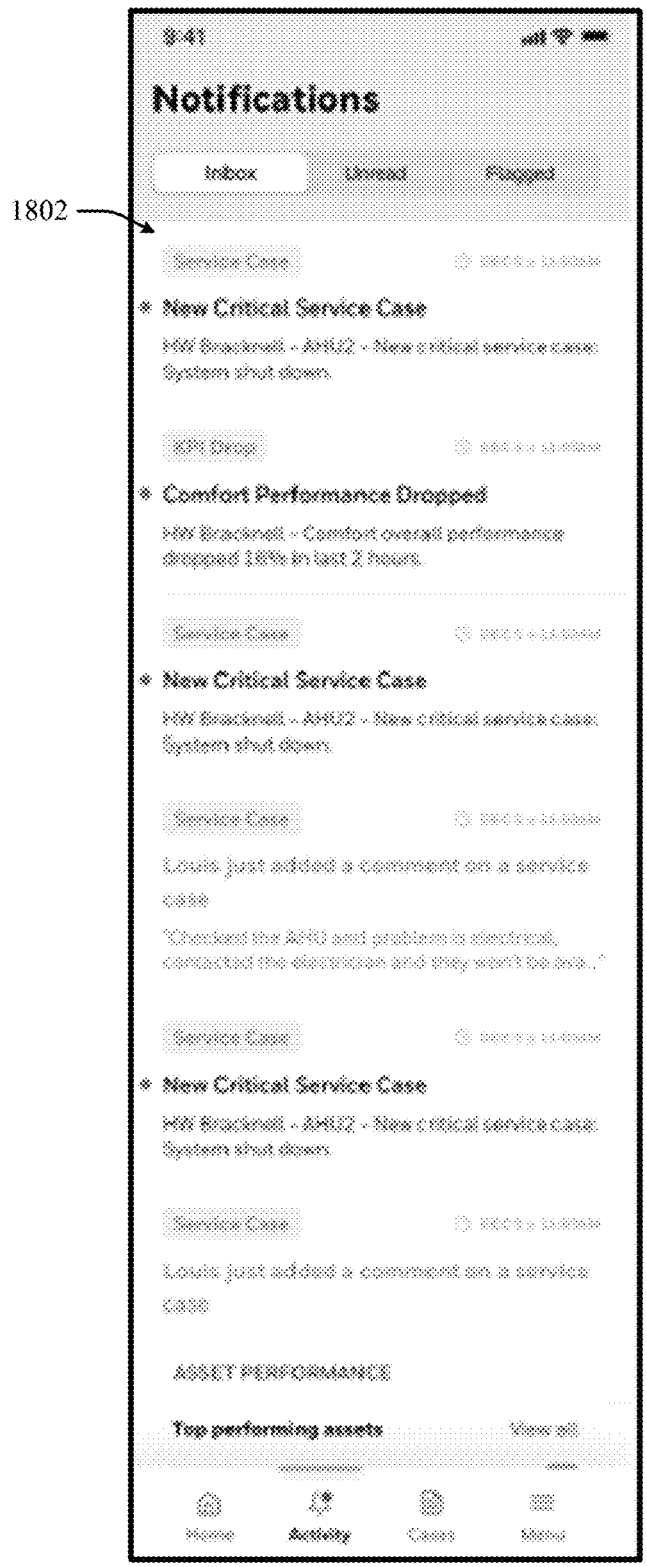
FIG. 18 illustrates another exemplary electronic interface, in accordance with one or more embodiments described herein.

FIG. 18 illustrates an exemplary electronic interface 1800 according to one or more embodiments of the disclosure. In an embodiment, the electronic interface 1800 is an electronic interface of the user computing device 402 that is presented via the visual display 504. In one or more embodiments, a dashboard visualization is rendered via the electronic interface 1800. In certain embodiments, the data visualization rendered via the electronic interface 1800 presents a visualization of one or more portions of the performance assurance data 322 for a portfolio of assets to facilitate analysis and/or management of the portfolio of assets via the dashboard visualization. In certain embodiments, the dashboard visualization rendered via the electronic interface 1800 presents one or more notifications for the portfolio of assets. For example, in certain embodiments, the electronic interface 1800 presents notification data 1802 configured to present a listing of notifications configured based on prioritized actions for a portfolio of assets. In certain embodiments, the listing of notifications associated with the notification data 1802 is ranked based on prioritized actions for the portfolio of assets, actionable insights associated with the portfolio of assets, changes associated with the portfolio of assets, and/or criticality of issues associated with the portfolio of assets. In certain embodiments, the electronic interface 1800 provides for filtering of the notification data 1802 based on location, notification type, asset type, date, and/or other criteria associated with the portfolio of assets. In certain embodiments, the electronic interface 1800 allows a user to change criticality of an asset issue, group assignment of assets issues, update a status related to asset issues, add a note related to an asset issue, collaborate with one or more other users with respect to an asset issue, and/or close an asset issue. In certain embodiments, the electronic interface 1800 allows a user to perform root cause analysis with respect to an asset issue and/or to provide input with respect to addressing an asset issue.

Figure 19:
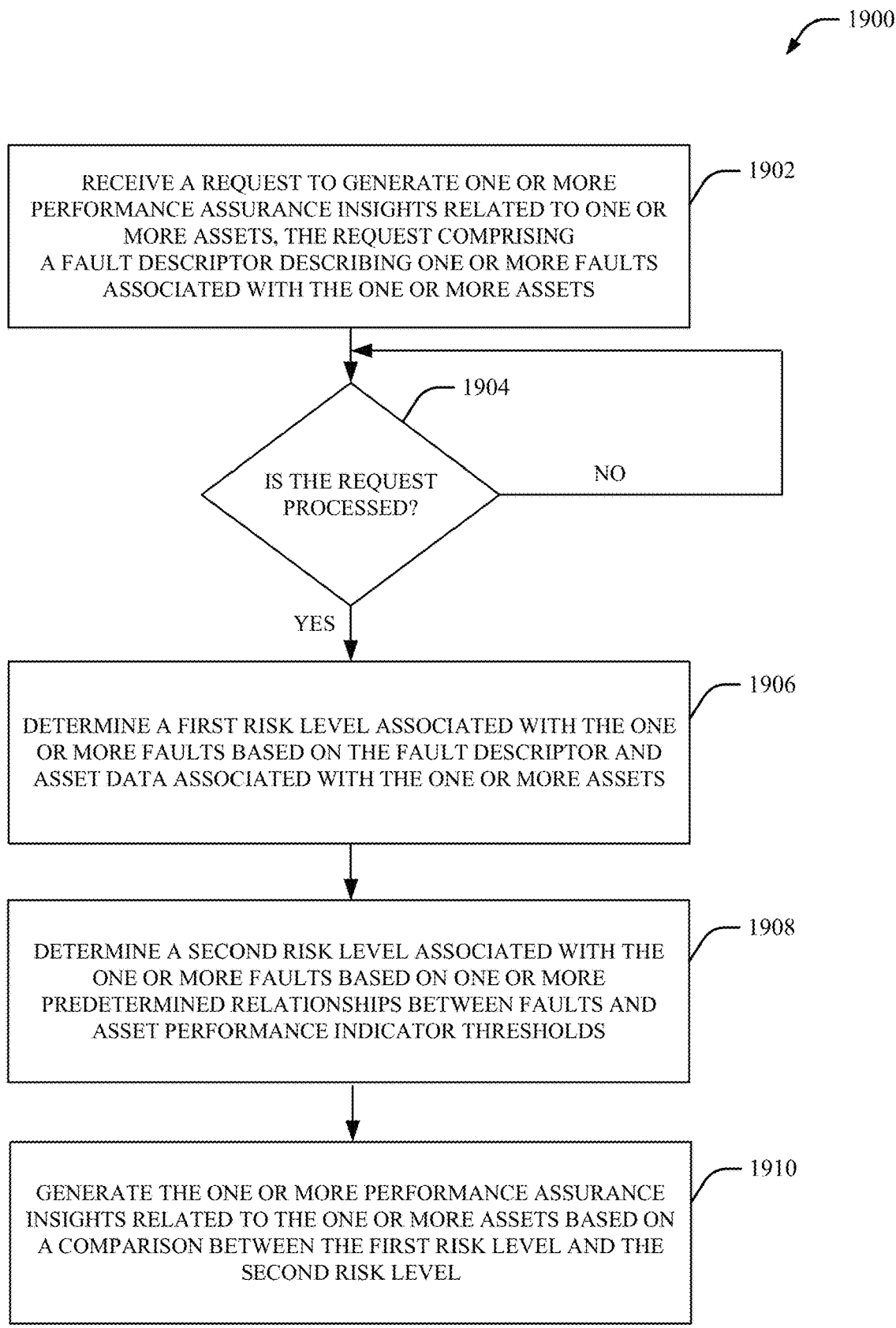
FIG. 19 illustrates a flow diagram for providing performance assurance modeling for a portfolio of assets, in accordance with one or more embodiments described herein.

FIG. 19 illustrates a method 1900 for providing performance assurance modeling for a portfolio of assets, in accordance with one or more embodiments described herein. The method 1900 is associated with the asset performance management server system 302, for example. For instance, in one or more embodiments, the method 1900 is executed at a device (e.g. the asset performance management server system 302) with one or more processors and a memory. In one or more embodiments, the method 1900 begins at block 1802 that receives (e.g., by the request component 304) a request to generate one or more performance assurance insights related to one or more assets, the request comprising a fault descriptor describing one or more faults associated with the one or more assets. The request provides one or more technical improvements such as, but not limited to, facilitating interaction with a user computing device and/or extended functionality for a user computing device. In certain embodiments, the request is received in response to the one or more faults occurring with respect to the one or more assets. In certain embodiments, the request is received in response to execution of a mobile application via a user computing device. In certain embodiments, the request is received in response to execution of a user authentication process via a user computing device.

At block 1904, it is determined whether the request is processed. For example, it can be determined whether the server system (e.g., the asset performance management server system 302) has processed the request. If no, block 1904 is repeated to determine whether the request is processed. If yes, the method 1900 proceeds to block 1906. In response to the request, the method 1900 includes a block 1906 that determines (e.g., by the KPI modeling component 306) a first risk level associated with the one or more faults based on the fault descriptor and asset data associated with the one or more assets. The determining the first risk level provides one or more technical improvements such as, but not limited to, extended functionality for a user computing device and/or improving performance of one or more assets. In one or more embodiments, the first risk level associated with the one or more faults is determined based on key performance indicator data (e.g., one or more defined performance indicators) associated with the one or more assets. In one or more embodiments, the first risk level associated with the one or more faults is additionally or alternatively determined based on sensor data associated with the one or more assets. In one or more embodiments, the first risk level associated with the one or more faults is additionally or alternatively determined based on service request data associated with the one or more assets. In one or more embodiments, the asset data includes context data associated with the one or more assets. In one or more embodiments, the context data includes location data (e.g., a zone identifier) and/or a type of enterprise (e.g., a type of facility, a type of area, a type of building, etc.).

In response to the request, the method 1900 also includes a block 1908 that determines (e.g., by the KPI modeling component 306) a second risk level associated with the one or more faults based on one or more predetermined relationships between faults and asset performance indicator thresholds. The determining the second risk level provides one or more technical improvements such as, but not limited to, extended functionality for a user computing device and/or improving performance of one or more assets.

In response to the request, the method 1900 also includes a block 1910 that generates (e.g., by the performance assurance component 308) the one or more performance assurance insights related to the one or more assets based on a comparison between the first risk level and the second risk level. The generating the one or more performance assurance insights provides one or more technical improvements such as, but not limited to, extended functionality for a user computing device and/or improving performance of one or more assets. In one or more embodiments, the one or more performance assurance insights are generated in response to a determination that the first risk level is different than the second risk level.

In certain embodiments, the method 1900 additionally or alternatively includes modifying a predetermined relationship between a fault and an asset performance indicator threshold in response to a determination that the first risk level is different than the second risk level. In certain embodiments, the method 1900 additionally or alternatively includes modifying a data matrix associated with the predetermined relationships between the faults and the asset performance indicator thresholds in response to a determination that the first risk level is different than the second risk level. In certain embodiments, the method 1900 additionally or alternatively includes generating dashboard visualization data associated with the one or more performance assurance insights in response to a determination that the first risk level is different than the second risk level. In certain embodiments, the method 1900 additionally or alternatively includes generating a notification for a dashboard visualization in response to a determination that the first risk level is different than the second risk level.

In certain embodiments, the method 1900 additionally or alternatively includes ranking a listing of notifications for a dashboard visualization based on the one or more performance assurance insights. In certain embodiments, the method 1900 additionally or alternatively includes presenting, via a dashboard visualization, an interactive display element associated with a service action for an asset in response to a determination that the first risk level is different than the second risk level. In certain embodiments, the method 1900 additionally or alternatively includes presenting, via a dashboard visualization, an interactive display element configured to initiate generation of a service case for an asset in response to a determination that the first risk level is different than the second risk level. In certain embodiments, the method 1900 additionally or alternatively includes presenting, via a dashboard visualization, an interactive display element configured to provide remote control of an asset in response to a determination that the first risk level is different than the second risk level. In certain embodiments, the method 1900 additionally or alternatively includes, in response to a determination that the first risk level is different than the second risk level, performing a security communication process with respect to an asset controller for an asset to provide remote control of the asset.

In certain embodiments, the method 1900 additionally or alternatively includes updating a key performance indicator model associated with the one or more performance assurance insights to generate an updated key performance indicator model in response to a determination that the first risk level is different than the second risk level. In certain embodiments, the method 1900 additionally or alternatively includes employing the updated key performance indicator model in response to a new request to generate one or more performance assurance insights related to the one or more assets. In certain embodiments, the method 1900 additionally or alternatively includes generating one or more mitigation recommendations to mitigate the one or more faults in response to a determination that the first risk level is different than the second risk level. In certain embodiments, the method 1900 additionally or alternatively includes determining an ordering for prioritized actions based on the one or more performance assurance insights. In certain embodiments, the method 1900 additionally or alternatively includes generating an alerts list for a dashboard visualization based on the ordering for the prioritized actions. In certain embodiments, the method 1900 additionally or alternatively includes grouping the prioritized actions based on location data or one or more features associated with the one or more assets.

Figure 20:
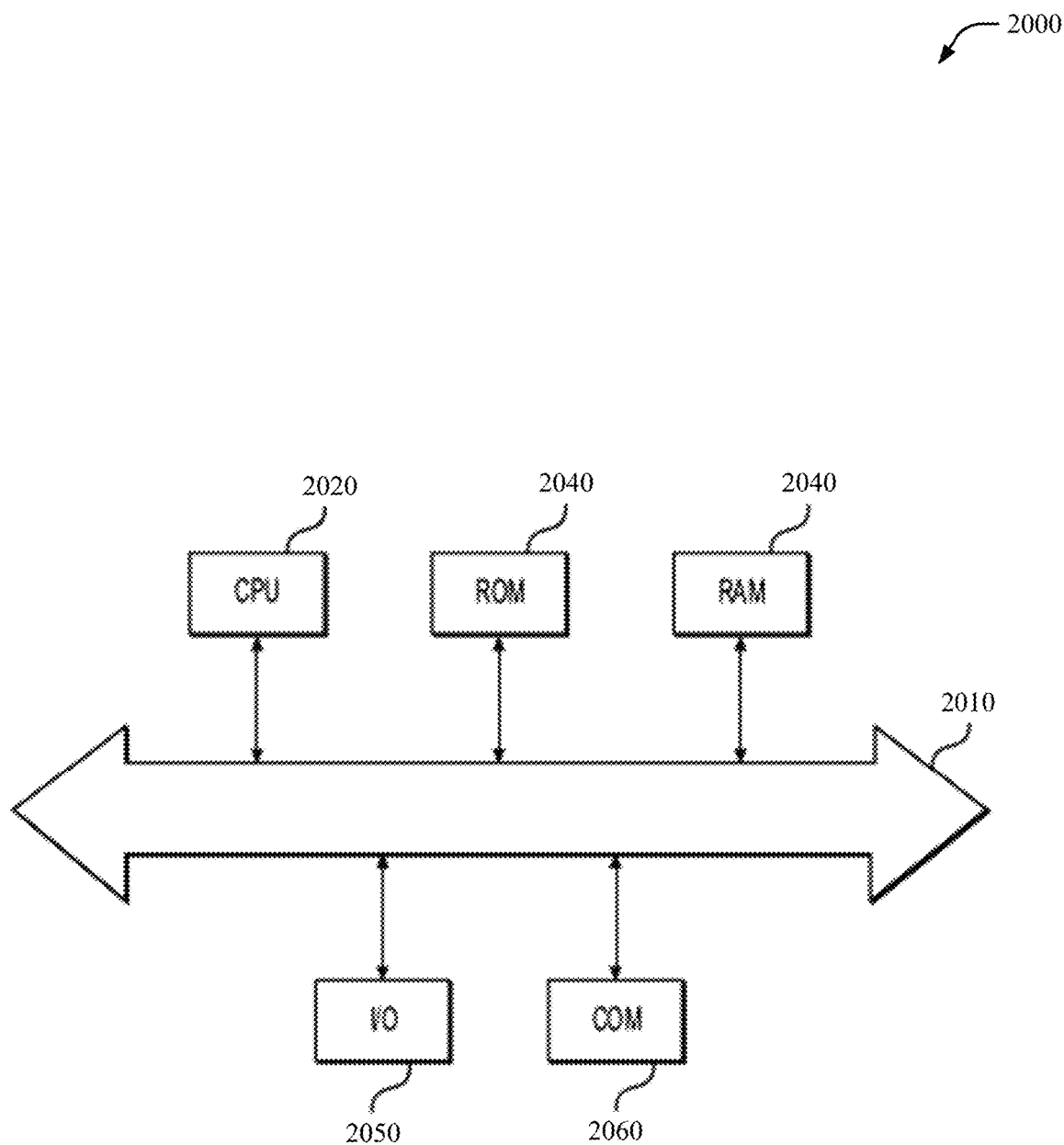
FIG. 20 illustrates a functional block diagram of a computer that may be configured to execute techniques described in accordance with one or more embodiments described herein.

FIG. 20 depicts an example system 2000 that may execute techniques presented herein. FIG. 20 is a simplified functional block diagram of a computer that may be configured to execute techniques described herein, according to exemplary embodiments of the present disclosure. Specifically, the computer (or "platform" as it may not be a single physical computer infrastructure) may include a data communication interface 2060 for packet data communication. The platform also may include a central processing unit ("CPU") 2020, in the form of one or more processors, for executing program instructions. The platform may include an internal communication bus 2010, and the platform also may include a program storage and/or a data storage for various data files to be processed and/or communicated by the platform such as ROM 2030 and RAM 2040, although the system 2000 may receive programming and data via network communications. The system 2000 also may include input and output ports 2050 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
one or more processors;
memory; and
one or more programs stored in the memory, the one or more programs including instructions configured to:
    receive, by the one or more processors, a request to generate one or more performance assurance insights related to one or more assets in a facility, wherein the request comprises:
        a fault descriptor, the fault descriptor describing one or more faults associated with the one or more assets; and
    in response to the request:
        receive, by the one or more processors, asset data associated with the one or more assets, wherein the asset data includes sensor data received from one or more sensors;
        determine, by the one or more processors, a first risk level associated with the one or more faults based on the fault descriptor, the asset data associated with the one or more assets, and context data associated with the one or more assets, wherein the context data includes location data associated with the one or more assets;
        determine, by the one or more processors, one or more predetermined relationships between the one or more faults and asset performance indicator thresholds, wherein the one or more faults and the asset performance indicator thresholds are correlated based on the location data associated with the one or more assets, and wherein the asset performance indicator threshold for an asset of the one or more assets is variable based on a location of the asset in the facility;
        determine, by the one or more processors, a second risk level associated with the one or more faults based on the one or more predetermined relationships between one or more historical faults associated with the one or more assets and the asset performance indicator thresholds;
        generate, by the one or more processors, the one or more performance assurance insights related to the one or more assets based on a comparison between the first risk level and the second risk level;
        determine by the one or more processors, whether the first risk level is different from the second risk level;
        modify, by the one or more processors, a predetermined relationship from the one or more predetermined relationships in response to the determination that the first risk level is different from the second risk level;
        generate, by the one or more processors, updated one or more performance assurance insights based on the modified predetermined relationship;
        control, by the one or more processors, display of the updated one or more performance assurance insights related to the one or more assets via a dashboard visualization; and
        execute, by the one or more processors, one or more prioritized actions associated with the one or more assets via the dashboard visualization based on the updated one or more performance assurance insights.

2. The system of claim 1, the one or more programs further including instructions configured to:
    determine, by the one or more processors, the first risk level associated with the one or more faults based on key performance indicator data associated with the one or more assets.

3. The system of claim 1, the one or more programs further including instructions configured to:
    determine, by the one or more processors, the first risk level associated with the one or more faults based on service request data associated with the one or more assets.

4. The system of claim 1, the one or more programs further including instructions configured to:
    modify, by the one or more processors, a data matrix associated with the one or more predetermined relationships between the faults and the asset performance indicator thresholds in response to a determination that the first risk level is different than the second risk level.

5. The system of claim 1, the one or more programs further including instructions configured to:
    update, by the one or more processors, a key performance indicator model associated with the one or more performance assurance insights to generate an updated key performance indicator model in response to a determination that the first risk level is different than the second risk level.

6. The system of claim 5, the one or more programs further including instructions configured to:
    employ, by the one or more processors, the updated key performance indicator model in response to a new request to generate the updated_one or more performance assurance insights related to the one or more assets.

7. The system of claim 1, the one or more programs further including instructions configured to:
    generate, by the one or more processors, one or more mitigation recommendations to mitigate the one or more faults in response to a determination that the first risk level is different than the second risk level.

8. The system of claim 1, the one or more programs further including instructions configured to:
    generate, by the one or more processors, a notification for the dashboard visualization in response to a determination that the first risk level is different than the second risk level.

9. The system of claim 1, the one or more programs further including instructions configured to:
- determine, by the one or more processors, an ordering for the one or more prioritized actions based on the updated one or more performance assurance insights; and
- generate, by the one or more processors, an alerts list for the dashboard visualization based on the ordering for the one or more prioritized actions.

10. The system of claim 1, the one or more programs further including instructions configured to:
- group, by the one or more processors, the one or more prioritized actions based on one of the location data or one or more features associated with the one or more assets.

11. A method, comprising:
at a device with one or more processors and a memory:
- receiving a request to generate one or more performance assurance insights related to one or more assets, wherein the request comprises:
  - a fault descriptor, the fault descriptor describing one or more faults associated with the one or more assets; and
- in response to the request:
  - receiving asset data associated with the one or more assets, wherein the asset data includes sensor data received from one or more sensors;
  - determining a first risk level associated with the one or more faults based on the fault descriptor, the asset data associated with the one or more assets, and context data associated with the one or more assets, wherein the context data includes location data associated with the one or more assets;
  - determining one or more predetermined relationships between the one or more faults and asset performance indicator thresholds, wherein the one or more faults and the asset performance indicator thresholds are correlated based on the location data associated with the one or more assets, and wherein the asset performance indicator threshold for an asset of the one or more assets is variable based on a location of the asset in the facility;
  - determining a second risk level associated with the one or more faults based on the one or more predetermined relationships between one or more historical faults associated with the one or more assets and the asset performance indicator thresholds;
  - generating the one or more performance assurance insights related to the one or more assets based on a comparison between the first risk level and the second risk level;
  - determining whether the first risk level is different from the second risk level;
  - modifying a predetermined relationship from the one or more predetermined relationships in response to the determination that the first risk level is different from the second risk level;
  - generating updated one or more performance assurance insights based on the modified predetermined relationship;
  - controlling, via a dashboard visualization, display of the updated one or more performance assurance insights related to the one or more assets; and
  - executing, via the dashboard visualization, one or more prioritized actions associated with the one or more assets based on the updated one or more performance assurance insights.

12. The method of claim 11, further comprising:
- modifying a data matrix associated with the one or more predetermined relationships between the faults and the asset performance indicator thresholds in response to a determination that the first risk level is different than the second risk level.

13. The method of claim 11, further comprising:
- updating a key performance indicator model associated with the one or more performance assurance insights to generate an updated key performance indicator model in response to a determination that the first risk level is different than the second risk level.

14. The method of claim 11, further comprising:
- employing the updated key performance indicator model in response to a new request to generate the updated one or more performance assurance insights related to the one or more assets.

15. The method of claim 11, further comprising:
- determining an ordering for the one or more prioritized actions based on the updated one or more performance assurance insights; and
- generating an alerts list for the dashboard visualization based on the ordering for the one or more prioritized actions.

16. A non-transitory computer-readable storage medium comprising one or more programs for execution by one or more processors of a device, the one or more programs including instructions which, when executed by the one or more processors, cause the device to:
- receive a request to generate one or more performance assurance insights related to one or more assets, wherein the request comprises:
  - a fault descriptor, the fault descriptor describing one or more faults associated with the one or more assets; and
- in response to the request:
  - receive asset data associated with the one or more assets, wherein the asset data includes sensor data received from one or more sensors;
  - determine a first risk level associated with the one or more faults based on the fault descriptor, the asset data associated with the one or more assets, and context data associated with the one or more assets wherein the context data includes location data associated with the one or more assets;
  - determine one or more predetermined relationships between the one or more faults and asset performance indicator thresholds, wherein the one or more faults and the asset performance indicator thresholds are correlated based on the location data associated with the one or more assets, and wherein the asset performance indicator threshold for an asset of the one or more assets is variable based on a location of the asset in the facility;
  - determine a second risk level associated with the one or more faults based on the one or more predetermined relationships between one or more historical faults associated with the one or more assets and the asset performance indicator thresholds;
  - generate the one or more performance assurance insights related to the one or more assets based on a comparison between the first risk level and the second risk level;
  - determine whether the first risk level is different from the second risk level;

modify a predetermined relationship from the one or more predetermined relationships in response to the determination that the first risk level is different from the second risk level;
generate updated one or more performance assurance insights based on the modified predetermined relationship:
control, via a dashboard visualization, display of the updated one or more performance assurance insights related to the one or more assets; and
execute, via the dashboard visualization, one or more prioritized actions associated with the one or more assets based on the updated one or more performance assurance insights.

* * * * *